(12) United States Patent
Nakamura

(10) Patent No.: US 11,200,820 B2
(45) Date of Patent: Dec. 14, 2021

(54) INFORMATION PROCESSOR, METHOD OF CONTROLLING INFORMATION PROCESSOR, AND STORAGE MEDIUM

(71) Applicant: MICWARE CO., LTD., Kobe (JP)

(72) Inventor: Hayato Nakamura, Kobe (JP)

(73) Assignee: MICWARE CO., LTD., Kobe (JP)

( * ) Notice: Subject to any disclaimer, the term of this patent is extended or adjusted under 35 U.S.C. 154(b) by 117 days.

(21) Appl. No.: 16/775,066

(22) Filed: Jan. 28, 2020

(65) Prior Publication Data
US 2020/0251032 A1 Aug. 6, 2020

(30) Foreign Application Priority Data

Jan. 31, 2019 (JP) .............................. JP2019-015888
Nov. 29, 2019 (JP) .............................. JP2019-217097

(51) Int. Cl.
G09G 3/00 (2006.01)
(52) U.S. Cl.
CPC ................................... G09G 3/006 (2013.01)
(58) Field of Classification Search
CPC .. G09G 3/006; G09G 2380/10; G06K 15/027; B60K 2370/184
See application file for complete search history.

(56) References Cited

U.S. PATENT DOCUMENTS

| | | | | |
|---|---|---|---|---|
| 6,075,561 A * | 6/2000 | Janko | .................... | H04N 17/004 348/180 |
| 6,344,902 B1 * | 2/2002 | Duke | .................... | H04N 1/6011 358/1.9 |
| 8,456,531 B2 * | 6/2013 | Winkler | ................. | G11B 27/10 348/192 |
| 8,867,848 B2 * | 10/2014 | Tsujino | .............. | G06K 9/00463 382/216 |
| 10,409,058 B2 * | 9/2019 | Tomioka | ................ | B60K 37/02 |
| 10,878,772 B2 * | 12/2020 | Tanaka | ................... | G09G 3/006 |
| 2010/0188580 A1 * | 7/2010 | Paschalakis | .......... | G06F 16/785 348/571 |
| 2010/0318312 A1 * | 12/2010 | Bhat | ...................... | G09G 3/006 702/108 |
| 2015/0341631 A1 * | 11/2015 | Lu | ........................... | H04N 9/30 348/189 |
| 2017/0249521 A1 * | 8/2017 | Brice | ................. | G06K 9/00979 |
| 2018/0330485 A1 * | 11/2018 | Harada | ................... | G06T 7/254 |

(Continued)

FOREIGN PATENT DOCUMENTS

WO    WO-2016/170618 A1    10/2016

*Primary Examiner* — Brian P Yenke
(74) *Attorney, Agent, or Firm* — Foley & Lardner LLP

(57) ABSTRACT

An object is to reduce the number of false detections of defects in a screen display test. A third control section includes: a first data acquiring section; a second data acquiring section; a comparing section configured to carry out a comparison between the first data and the second data; a searching section configured such that, in a case where there is a mismatch frame, the searching section carry out a search as to whether or not any of frame images matches up with the base image; and a third display control section configured such that, in a case where none of the frame images in the predetermined number of frames matches up with the base image, the display control section controls an output section to make an output indicating that there is a defect in the second data.

8 Claims, 17 Drawing Sheets

(56) References Cited

U.S. PATENT DOCUMENTS

2019/0164461 A1* 5/2019 Tomioka ................. G09G 3/006
2019/0286115 A1* 9/2019 Wang ..................... G06F 9/3877
2020/0059652 A1* 2/2020 Brice ................... H04N 17/004

* cited by examiner

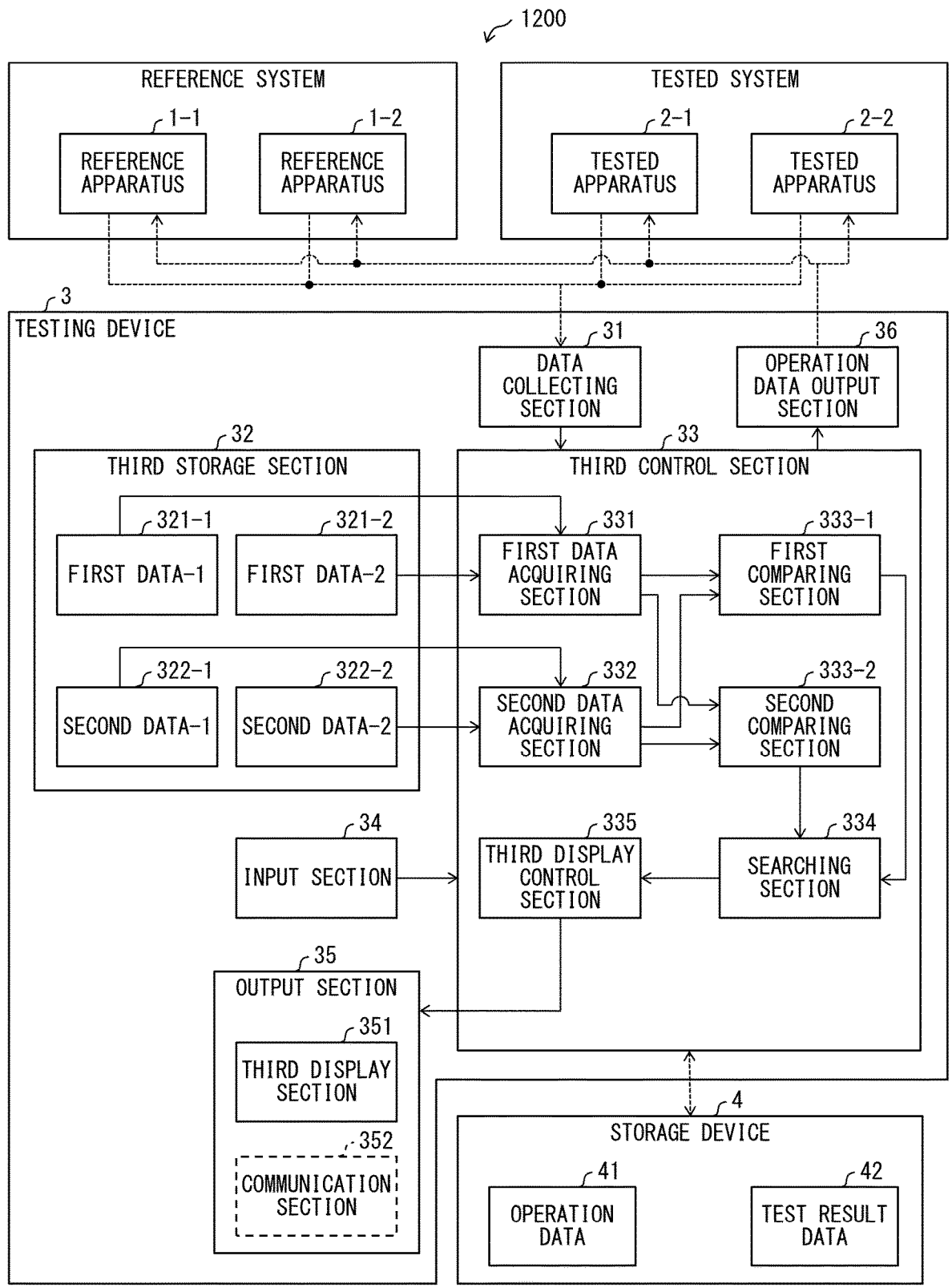

INFORMATION PROCESSOR, METHOD OF CONTROLLING INFORMATION PROCESSOR, AND STORAGE MEDIUM

This Nonprovisional application claims priority under 35 U.S.C. § 119 on Patent Application No. 2019-015888 filed in Japan on Jan. 31, 2019 and Patent Application No. 2019-217097 filed in Japan on Nov. 29, 2019, the entire contents of which are hereby incorporated by reference.

TECHNICAL FIELD

The present invention relates to, for example, an information processor for carrying out a screen display test.

BACKGROUND ART

There have been developed various kinds of device to automatically check whether display on a screen of an apparatus is normal or not. For example, Patent Literature 1 discloses a technique in which (i) a correct screen image and mask data are automatically generated and/or (ii) tendencies of differences that vary according to the environment and timing of a test are learned and used during testing. This technique thereby attempts to improve test efficiency and test accuracy.

CITATION LIST

Patent Literature

[Patent Literature 1]
Pamphlet of International Publication No. WO 2016/170618

SUMMARY OF INVENTION

Technical Problem

In a case where whether or not there is a defect in display on a screen is to be automatically determined, a very small display time (and/or position) difference, which is small to the extent that it is not supposed to be detected as a defect, may be falsely detected as a defect. For example, a display time (and/or position) difference which occurs on a screen of an apparatus under test and which is too small to be perceptible to the human eye may be detected as a defect. If this is the case, the number of defects detected on the apparatus increases, and this in turn sometimes necessitates a human operator to visually test the apparatus again.

An object of an aspect of the present invention is to achieve, for example, an information processor that is capable of reducing the number of false detections of defects in a screen display test.

Solution to Problem

An information processor in accordance with an aspect of the present invention includes a first data acquiring section, a second data acquiring section, a comparing section, a searching section, and a display control section. The first data acquiring section is configured to acquire first data. The first data is moving image data generated by a reference apparatus on the basis of first operation data that contains (i) information indicative of content of a user operation and (ii) information indicative of a point in time at which the user operation was carried out. The second data acquiring section is configured to acquire second data. The second data is moving image data generated by a tested apparatus on the basis of second operation data that is identical to the first operation data. The comparing section is configured to carry out a comparison between the first data and the second data sequentially on a per-frame basis. The searching section is configured such that, in a case where a result of the comparison by the comparing section indicates that there is a frame in which the first data and the second data do not match up with each other, the searching section (i) decides to use, as a base image, one of respective frame images of the first data and the second data in the frame and (ii) carry out a search as to whether or not any of frame images, in a predetermined number of frames preceding and/or following the other of the respective frame images, matches up with the base image. The display control section is configured such that, in a case where none of the frame images in the predetermined number of frames matches up with the base image, the display control section controls an output section to make an output indicating that there is a defect in the second data.

Advantageous Effects of Invention

According to an aspect of the present invention, it is possible to reduce the number of false detections of defects in a screen display test.

BRIEF DESCRIPTION OF DRAWINGS

FIG. 17 is a block diagram illustrating a configuration of main parts of apparatuses and devices included in Variation 4 of the configuration of main parts of the test system in accordance with Embodiment 1.

DESCRIPTION OF EMBODIMENTS

<<System Overview>>

A test system in accordance with each embodiment of the present invention is a system to carry out a screen display test. The screen display test is a test to determine whether display on a screen of an apparatus under test is normal or abnormal.

As used herein, the phrase "display on a screen is normal" means that, for example, an apparatus under test causes a predetermined image to be displayed on a screen with a predetermined degree of accuracy at a predetermined point in time. Note that the meaning of the term "image" herein can include a still image and a moving image. Also in the following descriptions, the term "image" means a still image and/or a moving image. On the contrary, the phrase "display on a screen is abnormal" means that an apparatus under test fails to cause a predetermined image to be displayed on a screen with a predetermined degree of accuracy at a predetermined point in time, due to some defect.

The screen display test is carried out on, for example, an apparatus before shipment, as part of a performance test. For example, in a case where a software program relating to display on a screen is prepared or updated, a screen display test is carried out, as part of a test on the behavior of the program, on an apparatus having the program installed thereon.

The "image" can contain a graphical user interface (GUI). In a case where an image to be displayed on an apparatus under test in a screen display test contains a GUI, it can be said that the screen display test also serves as a GUI performance test. The following description will discuss specific examples of a test system in accordance with the present invention in detail, based on Embodiments 1 to 6.

Embodiment 1

<<Configuration of Main Parts>>

Figure 1:
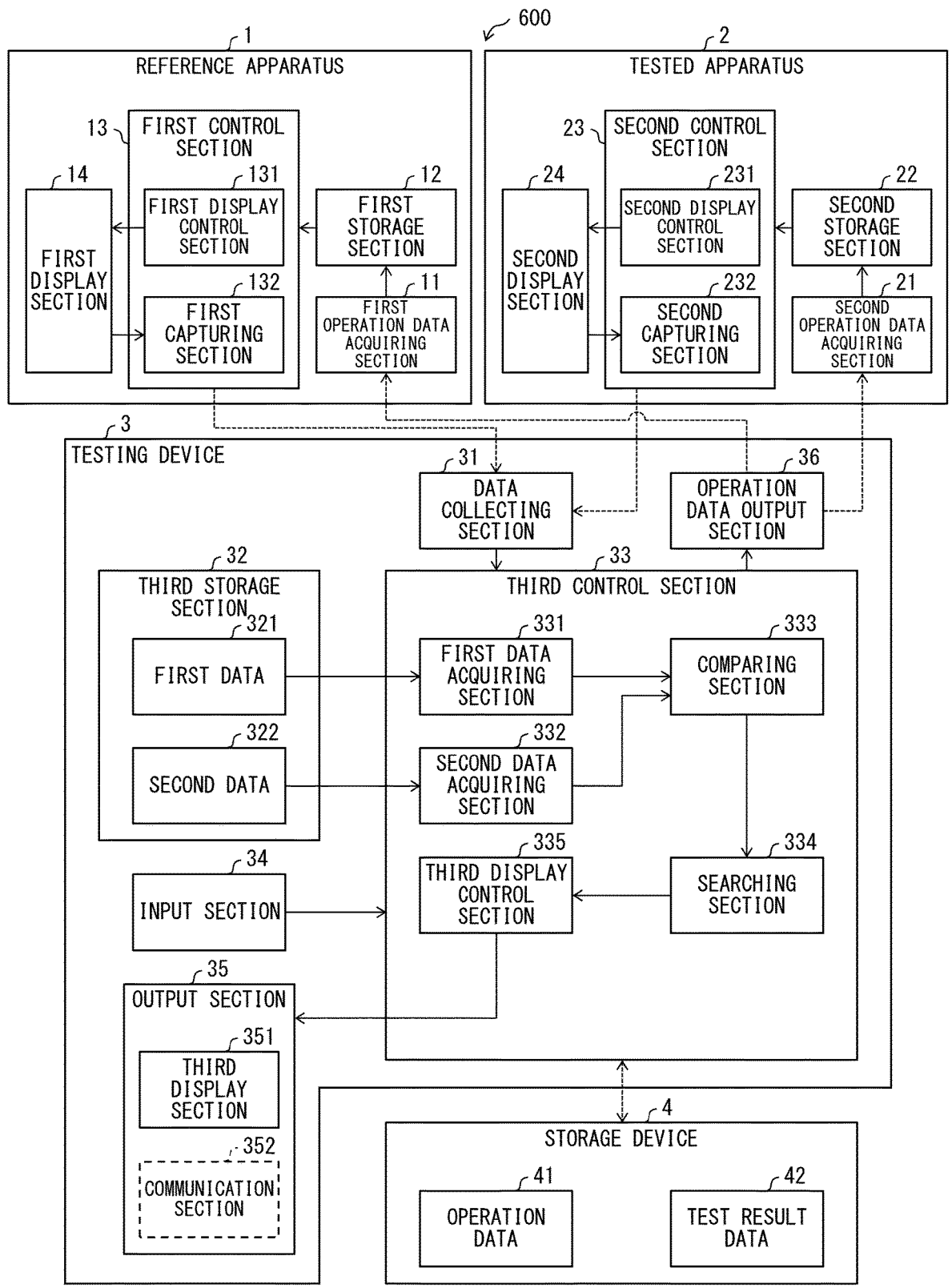
FIG. 1 is a block diagram illustrating a configuration of main parts of apparatuses and devices that are included in a test system in accordance with Embodiment 1.

The following description will discuss a test system 600 in accordance with Embodiment 1, with reference to FIGS. 1 to 6. FIG. 1 is a block diagram illustrating a configuration of main parts of apparatuses and devices that are included in the test system 600. As illustrated in FIG. 1, the test system 600 includes a reference apparatus 1, a tested apparatus 2 (apparatus under test), a testing device 3, and a storage device 4.

The testing device 3 is a device to carry out a screen display test. The storage device 4 is a storage device provided externally to the testing device 3. The tested apparatus 2 is an apparatus tested in the screen display test. On the contrary, the reference apparatus 1 is a reference apparatus serving as the basis of comparison with the tested apparatus 2 in the screen display test carried out by the test system 600.

The testing device 3 is connected, via wired or wireless connection, to one or more reference apparatuses 1, one or more tested apparatuses 2, and one or more storage devices 4. Embodiment 1 is discussed on the assumption that the testing device 3 is connected to one reference apparatus 1, one tested apparatus 2, and one storage device 4, as illustrated in FIG. 1, unless otherwise specified.

The reference apparatus in Embodiment 1 is an apparatus whose performance serves as the basis of comparison. The accuracy of display of an image on the reference apparatus 1 and a point in time at which the image is displayed on the reference apparatus 1 serve as the basis with reference to which whether the accuracy of display of an image on the tested apparatus 2 and a point in time at which the images is displayed on the tested apparatus 2, i.e., display on a screen of the tested apparatus 2, are normal or abnormal is determined.

Note that the reference apparatus 1 and the tested apparatus 2 may be of the same kind or may be of different kinds. Embodiment 1 is discussed on the assumption that the reference apparatus 1 and the tested apparatus 2 are of the same kind. For example, the reference apparatus 1 and the tested apparatus 2 are each realized by a display device of a car-mounted terminal included in an automotive navigation system.

(Reference Apparatus 1)

The reference apparatus 1 includes a first operation data acquiring section 11, a first storage section 12, a first control section 13, and a first display section 14.

The first operation data acquiring section 11 acquires operation data from the testing device 3. The operation data is data that contains (i) information indicative of content of a user operation and (ii) information indicative of a point in time at which the operation was carried out. The operation data will be described later in detail. The first operation data acquiring section 11 stores the thus-acquired data in the first storage section 12.

The first storage section 12 is a storage device for storing operation data. The first storage section 12 also stores various programs to be executed by the first control section 13. For example, the first storage section 12 stores programs relating to display control, which are to be executed by the first control section 13. The programs relating to display control are hereinafter referred to as "display programs".

The first control section 13 carries out overall control of the reference apparatus 1 by executing programs stored in the first storage section 12. For example, the first control section 13 has (i) the function of carrying out display control for the first display section 14 and (ii) the function of carrying out capturing of a screen on the first display section 14. In order to achieve these functions, the first control section 13 includes a first display control section 131 and a first capturing section 132.

The first display control section 131 reads a display program and operation data from the first storage section 12, and controls the first display section 14 in accordance with descriptions of the display program and the operation data. This causes the first display section 14 to display an image which has resulted from the execution of the display program in accordance with the content of the input operation described in the operation data.

The first capturing section 132 captures an image displayed on a screen of the first display section 14 as moving image data. As described earlier, the first display section 14 is controlled by the first display control section 131 to display an image in accordance with the description of the operation data. Thus, the moving image data captured by the first capturing section 132 can be said to be moving image data that is generated by the reference apparatus 1 based on the operation data. The first capturing section 132 transmits the thus-captured moving image data to the testing device 3.

The moving image data captured by the first capturing section 132 is hereinafter referred to as "first data".

Note that the first data transmitted from the first capturing section 132 to the testing device 3 may be the captured moving image data having added thereto an identifier indicative of the reference apparatus 1. For example, in a case where the test system 600 includes a plurality of reference apparatuses 1, it is preferable that the testing device 3 can identify from which reference apparatus 1 the first data has come. Therefore, in this case, first data preferably has added thereto an identifier indicative of a certain reference apparatus 1.

The first display section 14 is a display device on which an image is displayed in accordance with control by the first control section 13. There is no particular limitation on a specific configuration of the first display section 14.

(Tested Apparatus 2)

The tested apparatus 2 includes a second operation data acquiring section 21, a second storage section 22, a second control section 23, and a second display section 24.

The second operation data acquiring section 21 acquires operation data from the testing device 3. Note here that the operation data acquired by the second operation data acquiring section 21 is the same as the operation data acquired by the first operation data acquiring section 11 of the reference apparatus 1. The second operation data acquiring section 21 stores the thus-acquired operation data in the second storage section 22.

The second storage section 22 is a storage device for storing operation data. The second storage section 22 also stores various programs to be executed by the second control section 23. For example, the second control section 23 stores display programs to be executed by the second control section 23.

The second control section 23 carries out overall control of the tested apparatus 2 by executing programs stored in the second storage section 22. For example, the second control section 23 has (i) the function of carrying out display control for the second display section 24 and (ii) the function of carrying out capturing of an image displayed on a screen of the second display section 24. In order to achieve these functions, the second control section 23 includes a second display control section 231 and a second capturing section 232.

The second display control section 231 reads a display program and operation data from the second storage section 22, and controls the second display section 24 in accordance with descriptions of the display program and the operation data. This causes the second display section 24 to display an image which has resulted from the execution of the display program in accordance with the content of the input operation described in the operation data.

The second capturing section 232 captures an image displayed on a screen of the second display section 24 as moving image data. As described earlier, the second display section 24 is controlled by the second display control section 231 to display an image in accordance with the description of the operation data. Thus, the moving image data captured by the second capturing section 232 can be said to be moving image data that is generated by the tested apparatus 2 based on the operation data. The second capturing section 232 transmits the thus-captured moving image data to the testing device 3. The moving image data captured by the second capturing section 232 is hereinafter referred to as "second data".

Note that the second data transmitted from the second capturing section 232 to the testing device 3 may be the captured moving image data having added thereto an identifier indicative of the tested apparatus 2. For example, in a case where the test system 600 includes a plurality of tested apparatuses 2, it is preferable that the testing device 3 can identify from which tested apparatus 2 the second data has come. Therefore, in this case, second data preferably has added thereto an identifier indicative of a certain tested apparatus 2.

The second display section 24 is a display device on which an image is displayed in accordance with control by the second control section 23. There is no particular limitation on a specific configuration of the second display section 24.

(Storage Device 4)

The storage device 4 is a storage device for storing operation data and test results. The storage device 4 stores operation data 41. The storage device 4 may store test result data 42.

The operation data 41 is data indicative of content of a user input operation and a point in time at which the user input operation was carried out. For example, the operation data 41 may be log data indicative of a user input operation actually carried out on the reference apparatus 1 or on another apparatus that is of the same kind as the reference apparatus 1. The operation data 41 may be, for example, data automatically generated by the testing device 3 or some other external device. The operation data 41 may be, for example, data that can be prepared and edited by a user with use of a dedicated tool installed on the testing device 3 or some other external device.

The test result data 42 is data indicative of a result of a screen display test carried out by the testing device 3. A result of a screen display test hereinafter may be referred to as "test result" for short.

(Testing Device 3)

The testing device 3 includes a data collecting section 31, a third storage section 32, a third control section 33, an input section 34, an output section 35, and an operation data output section 36.

The data collecting section 31 receives first data from the reference apparatus 1. The data collecting section 31 stores the thus-received first data, as first data 321, in the third storage section 32. The data collecting section 31 also receives second data from the tested apparatus 2. The data collecting section 31 stores the thus-received second data, as second data 322, in the third storage section 32.

Note that, in a case where the testing device 3 is connectable to a plurality of reference apparatuses 1 in the test system 600, it is preferable that the data collecting section 31 stores, in the third storage section 32, a plurality of pieces of received first data on a per-reference-apparatus-basis. Also, in a case where the testing device 3 is connectable to a plurality of tested apparatuses 2 in the test system 600, it is preferable that the data collecting section 31 stores, in the third storage section 32, a plurality of pieces of received second data on a per-tested-apparatus-2 basis.

The third storage section 32 is a storage device for storing various kinds of data for use in the testing device 3. The third storage section 32 stores the first data 321 and the second data 322. In a case where the testing device 3 is connectable to a plurality of reference apparatuses 1 in the test system 600, the third storage section 32 stores a plurality of pieces of first data 321 on a per-reference-apparatus-1 basis. Also, in a case where the testing device 3 is connectable to a plurality of tested apparatuses 2 in the test system 600, the third storage section 32 stores a plurality of pieces of second data 322 on a per-tested-apparatus-2 basis. The third storage section 32 also stores various programs to be executed by the third control section 33 of the testing device 3.

The operation data output section 36 reads the operation data 41 from the storage device 4, and transmits the operation data 41 to the reference apparatus 1 and to the tested apparatus 2. There is no particular limitation on the point in time at which the operation data output section transmits the operation data 41 to the reference apparatus 1 and to the tested apparatus 2. For example, in a case where the third control section 33 has determined that the input section 34 has received an input operation that instructs transmission of operation data, the operation data output section 36 transmits the operation data 41 to the reference apparatus 1 and to the tested apparatus 2.

The input section 34 is an input interface for receiving a user input operation. The input section 34 is realized by, for example, a mechanical button and/or a mouse provided to the testing device 3. The input section 34 transmits content of the input operation to the third control section 33.

The output section 35 includes at least one of a third display section 351 and a communication section 352. The third display section 351 is a display device to display an image in accordance with control by the third control section 33. There is no particular limitation on a specific configuration of the third display section 351. The communication section 352 supplies, in accordance with control by the third control section 33, an image to an external device via wired connection such as Ethernet (registered trademark) or via wireless connection such as WiFi (registered trademark) or BlueTooth (registered trademark).

(Third Control Section 33)

The third control section 33 is an information processor to carry out overall control of the testing device 3 by executing programs stored in the third storage section 32. The third control section 33 identifies the content of the instruction indicated by the input operation transmitted from the input section 34 and, in accordance with the content of the instruction, controls a relevant section(s) of the testing device 3.

Specifically, the third control section 33 reads the operation data 41 from the storage device 4, and transmits the operation data 41 to the operation data output section 36. The third control section 33 acquires the first data 321 and the second data 322, and compares moving images of the first data 321 and the second data 322 with each other on a per-frame basis. Next, in a case where the result of the comparison indicates that a certain frame image of one data and a corresponding frame image of the other data do not match up with each other, the third control section 33 carries out a search as to whether any of frame images in a predetermined number of frames preceding and/or following the certain frame of the one data matches up with the corresponding frame image of the other data. By so doing, the third control section 33 determines whether or not there is a defect in the second data 322. Then, the third control section 33 controls the third display section 351 to display the result of the determination, i.e., the result of a screen display test. In order to achieve these functions, the third control section 33 includes a first data acquiring section 331, a second data acquiring section 332, a comparing section 333, a searching section 334, and a third display control section 335.

The first data acquiring section 331 acquires the first data 321 from the third storage section 32. The first data acquiring section 331 transmits the thus-acquired first data 321 to the comparing section 333. Note that, in a case where the testing device 3 receives a plurality of pieces of first data from a plurality of reference apparatuses 1, the third storage section 32 stores the plurality of pieces of first data 321 on a per-reference-apparatus-1 basis. In such a case, the first data acquiring section 331 may decide which piece of first data 321 to read, in accordance with a user input operation on the input section 34.

The second data acquiring section 332 acquires the second data 322 from the third storage section 32. The second data acquiring section 332 transmits the thus-acquired second data 322 to the comparing section 333. Note that, in a case where the testing device 3 receives a plurality of pieces of second data from a plurality of tested apparatuses 2, the third storage section 32 stores the plurality of pieces of second data 322 on a per-tested-apparatus-2 basis. In such a case, the second data acquiring section 332 may decide which piece of second data 322 to read, in accordance with a user input operation on the input section 34.

The comparing section 333 sequentially compares the first data 321 and the second data 322 on a per-frame basis. As described earlier, the first data 321 and the second data 322 are images generated by the reference apparatus 1 and the tested apparatus 2, respectively, based on the same operation data. Embodiment 1 is discussed on the assumption that the first data 321 and the second data 322 are pieces of moving image data with the same number of frames.

The comparing section 333 notifies the searching section 334 of a result of the comparison. Specifically, the comparing section 333 determines whether or not a frame image with a certain frame number of the first data 321 matches up with a frame image with the same frame number of the second data 322, and notifies the searching section 334 of the frame number and a result of the determination which are in association with each other. Note that the "frame number" is one of the serial numbers given to respective frame images of moving image data. When all the frames of the first data 321 and the second data 322 have been subjected to the comparison, the comparing section 333 notifies the searching section 334 that all the frames have been subjected to the comparison.

Note that the comparing section 333 may notify the searching section 334 of the frame numbers and the respective corresponding results of comparison with regard to all the frames at a time after all the frames have been subjected to the comparison. In this case, the comparing section 333 does not need to re-notify the searching section 334 that all the frames have been subjected to the comparison.

The searching section 334 carries out the following process in accordance with the content notified by the comparing section 333. First, in a case where the result of determination the searching section 334 has received from the comparing section 333 is that a frame image in a certain frame of the first data 321 and a corresponding frame image in that frame of the second data 322 match up with each other, the searching section 334 determines that a test result on the second data with regard to that frame is normal.

On the contrary, in a case where the result of determination the searching section 334 has received from the comparing section 333 is that a frame image in a certain frame of the first data 321 and a corresponding frame image in that frame of the second data 322 do not match up with each other, the searching section 334 carries out the following processes (1) and (2) with regard to that frame in which the images do not match up with each other. Hereinafter, a frame in which a frame image of the first data 321 and a corresponding frame image of the second data 322 do not match up with each other is referred to as "mismatch frame". The following processes (1) and (2) may be collectively referred to as "search process". Note that specific examples of the search process will be described later.

(1) Decide to use, as a base image, one of respective frame images of first data and second data in a mismatch frame.

(2) Carry out a search as to whether or not any of frame images, in a predetermined number of frames preceding and/or following the other of the foregoing respective frame images (i.e., the image which is not the base image), matches up with the base image. Hereinafter, the other of the foregoing respective frame images, which is not the base image, may be referred to as "search subject image".

The "predetermined number" in in the process (2) is, in other words, the number of frames that is tolerable as a difference relative to the base image (the "predetermined number" will be described later in detail). This predetermined number may be hereinafter referred to as "acceptable number of frames".

In a case where, as a result of the process (2), any of the frame images in the predetermined number of frames matches up with the search subject image in the mismatch frame, the searching section 334 determines that a test result on the second data with regard to the mismatch frame is normal. Specifically, with regard to second data that the searching section 334 has received from the tested apparatus 2, in a case where the difference (i.e., the number of frames) between an image of the second data and a corresponding image of the first data is within the range of the acceptable number of frames, the searching section 334 determines that the display time difference is not a defect. Note that it is preferable that the acceptable number of frames, divided by a frame rate of the first data 321 or the second data 322, is a period shorter than 0.3 seconds. Generally, it is believed that the smallest display time difference perceptible to the human eye is about 0.3 seconds. Therefore, when the number of frames within which a display time difference is tolerable is equal to or less than the number corresponding to about 0.3 seconds as described above, even if some defect occurs in a display screen, small display time differences not perceptible to a user are tolerated and only those which are greater are detected as defects.

On the contrary, in a case where, as a result of the searching of (2), none of the frame images in the predetermined number of frames matches up with the search subject image in the mismatch frame, the searching section 334 determines that a test result on the second data with regard to the mismatch frame is abnormal. That is, the searching section 334 determines that the second data has some defect in the mismatch frame.

The searching section 334 carries out the above processes (1) and (2) every time the searching section 334 is notified by the comparing section 333 that a frame image of the first data 321 and a corresponding frame image of the second data 322 do not match up with each other. Then, upon receipt of a notification from the comparing section 333 that all the frames have been subjected to the comparison, the searching section 334 notifies the third display control section 335 of the test results on the respective frames. Alternatively, in a case where the searching section 334 is notified by the comparing section 333 of the results of comparison on all the frames at a time, the searching section 334 determines whether or not there is a defect in each frame in the foregoing manner and thereby obtains a test result on each frame, and notifies the third display control section 335 of the test results.

Each test result that the third display control section 335 is notified of by the searching section 334 may contain, for example, (i) a frame number and (ii) information indicative of whether a frame image of that frame number in second data is normal or abnormal.

The searching section 334 may notify the third display control section 335 of a test result with regard to second data as a whole, instead of or in addition to the test results with regard to the respective frames. For example, in a case where the following condition (A) or (B) is satisfied, the searching section 334 may notify the third display control section 335 of a test result indicating that the second data is normal:

(A) there are no mismatch frames; or (B) there are mismatch frames, but it is determined that the second data is normal with regard to all the mismatch frames.

On the contrary, in a case where neither of the conditions (A) and (B) is satisfied, that is, in a case where it is determined that the second data is abnormal with regard to any of the mismatch frames, the searching section 334 may notify the third display control section 335 that the second data is abnormal.

Note that the test result data 42 stored by the searching section 334 in the storage device 4 may be at least one of (i) test results with regard to respective frames and (ii) a test result with regard to second data as a whole.

The third display control section 335 prepares an image indicative of the test result(s) in accordance with the test result(s) notified by the searching section 334, and controls the third display section 351 to display the image. Specific examples of the image prepared by the third display control section 335 will be described later.

(Variation 1 of Configuration of Main Parts)

Note that, in the test system 600, the storage device 4 and the third storage section 32 may be configured integrally with each other. For example, the third storage section 32, which is an internal storage device included in the testing device 3, may store the first data 321, the second data 322, the operation data 41, and the test result data 42. In this case, the storage device 4 is not essential in the test system 600. Alternatively, for example, the storage device 4, which is an external storage device externally provided to the testing device 3, may store the first data 321, the second data 322, the operation data 41, and the test result data 42.

In either case, it is only necessary that the third control section 33, the first data acquiring section 331, and the second data acquiring section 332 read, from the third storage section 32 or the storage device 4, data for use in each section's operation. The searching section 334 may store the test result data 42 in the third storage section 32 or the storage device 4.

(Variation 2 of Configuration of Main Parts)

The test system 600 in accordance with Embodiment 1 may include a first camera 5 and a second camera 6. The following description will discuss, with reference to FIG. 16, a test system 1100 that includes the first camera 5 and the second camera 6.

Figure 16:
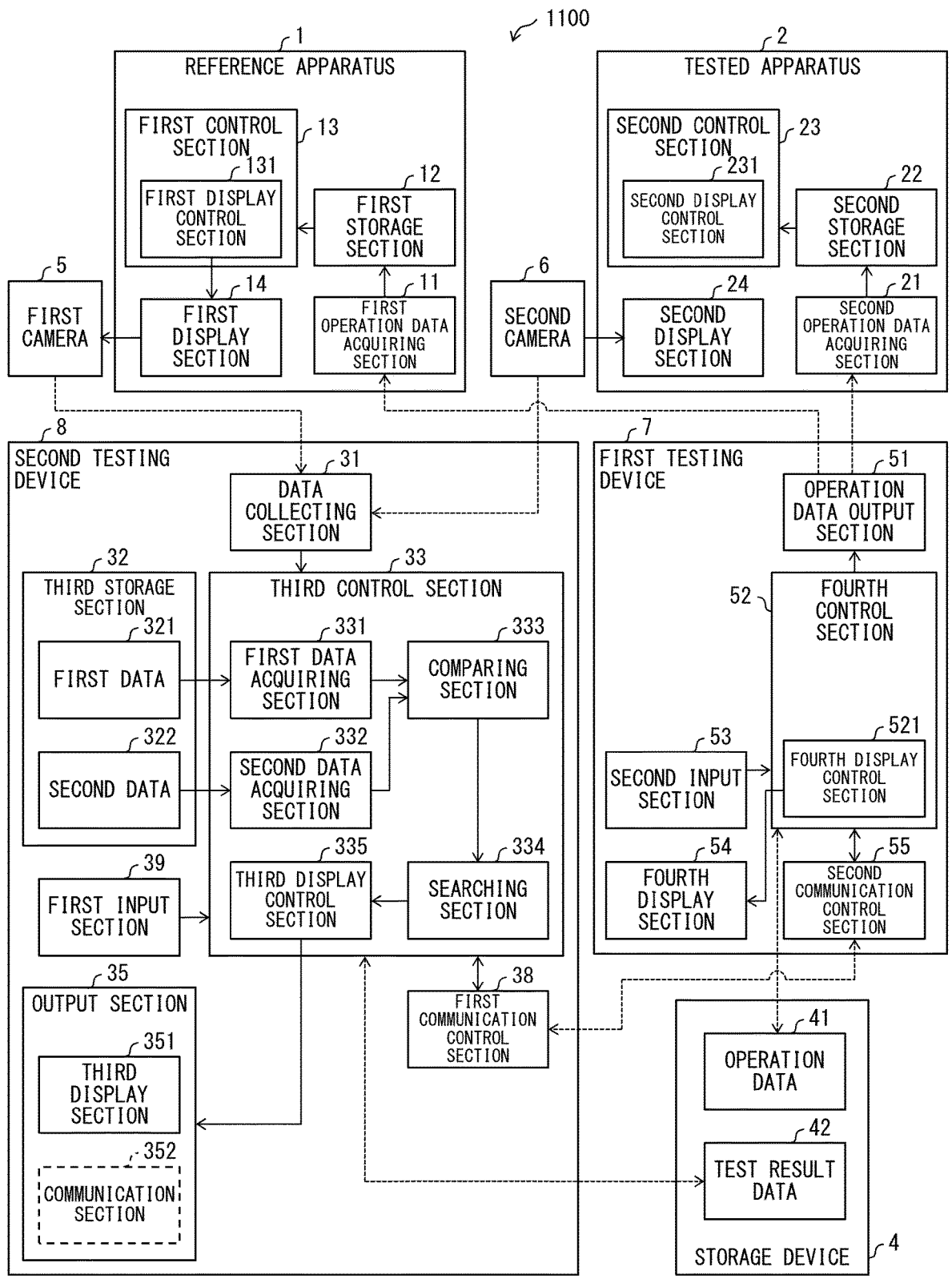
FIG. 16 is a block diagram illustrating a configuration of main parts of apparatuses and devices included in Variation 2 of the configuration of main parts of the test system in accordance with Embodiment 1 and Variation 3 of the configuration of the main parts of the test system in accordance with Embodiment 1.

FIG. 16 is a block diagram illustrating a configuration of main parts of apparatuses and devices included in the test system 1100, which serves as Variation 2 and Variation 3 of the configuration of main parts of the test system 600. The test system 1100 is different from the test system 600 in that the test system 1100 includes the first camera 5 and the second camera 6. Note that, in the test system 1100, the first capturing section 132 and the second capturing section 232 are not essential.

The first camera 5 takes a video of a display screen of the first display section 14, and thereby acquires a moving image composed of images sequentially displayed on the first display section 14. That is, the first camera 5 acquires first data. The second camera 6 takes a video of a display screen of the second display section 24, and thereby acquires a moving image composed of images sequentially displayed on the second display section 24. That is, the second camera 6 acquires second data. The data collecting section 31 of the test system 1100 acquires the first data and the second data from the first camera 5 and the second camera 6, respectively. Note, here, that the first data acquiring section 331 and/or the second data acquiring section 332 may adjust the first data or the second data so that the sizes of to-be-compared screens become equal to each other and/or so that both images have equal or similar color tones, color saturations, and/or the like. This improves the accuracy of comparison carried out by the comparing section 333.

(Variation 3 of Configuration of Main Parts)

The test system 1100 in accordance with Embodiment 1 may include a first testing device 7 configured to transmit operation data to the reference apparatus 1 and to the tested apparatus 2, as illustrated in FIG. 16. The test system 1100 may include a second testing device 8. The second testing device 8 may be configured such that the second testing device 8 acquires pieces of captured moving image data from the first capturing section 132 of the reference apparatus 1 and the second capturing section 232 of the tested apparatus 2, respectively, or from the first camera 5 and the second camera 6, respectively, and compares the acquired pieces of captured moving image data.

The first testing device 7 may include: an operation data output section 51 that is equivalent in function to the operation data output section 36; a fourth control section 52 that carries out overall control of the first testing device 7; a fourth display control section 521 that is equivalent in function to the third display control section 335; a second input section 53 that is equivalent in function to the input section 34; a fourth display section 54 that is equivalent in function to the third display section 351; and a second communication control section 55.

The second testing device 8 may include a first input section 39 that is equivalent in function to the input section 34. The second testing device 8 includes a first communication control section 38. The first communication control section 38 is configured such that: in a case where the first data acquired from the reference apparatus 1 and the second data acquired from the tested apparatus 2 do not match up with each other at least partially, the first communication control section 38 transmits a request to the first testing device 7 to acquire operation data 41 at a point in time at which a defect occurred, and receives the operation data 41 that is transmitted from the first testing device 7 in response to the request. The first testing device 7 may include a second communication control section 55. The second communication control section 55 receives, from the second testing device 8, the request to acquire the operation data 41, and transmits the operation data 41 in response to the request for the first testing device 7 to acquire the operation data 41.

(Variation 4 of Configuration of Main Parts)

The test system 600 in accordance with Embodiment 1 of the present invention may transmit the operation data 41 to a plurality of reference apparatuses 1 and to a plurality of tested apparatuses 2. The following description will discuss, with reference to FIG. 17, a test system 1200 that includes the plurality of reference apparatuses 1 and the plurality of tested apparatuses 2.

FIG. 17 is a block diagram illustrating a configuration of main parts of devices and apparatuses included in the test system 1200, which is Variation 4 of the configuration of main parts of the test system 600. A reference apparatus 1-1 and a reference apparatus 1-2 are each equal in configuration to the reference apparatus 1. A tested apparatus 2-1 and a tested apparatus 2-2 are each equal in configuration to the tested apparatus 2. The operation data output section 36 transmits operation data 41 to at least one of the reference apparatus 1-1, the reference apparatus 1-2, the tested apparatus 2-1, and the tested apparatus 2-2. In the test system 1200, the data collecting section 31 collects first data-1 from the reference apparatus 1-1, collects first data-2 from the reference apparatus 1-2, collects second data-1 from the tested apparatus 2-1, and collects second data-2 from the tested apparatus 2-2. The first data-1 and the first data-2 are first data generated by the reference apparatus 1-1 and the first data generated by the reference apparatus 1-2, respectively. The second data-1 and the second data-2 are second data generated by the tested apparatus 2-1 and second data generated by the tested apparatus 2-2, respectively. The test system 1200 includes: a first comparing section 333-1 that compares the first data-1 and the second data-1 collected by the data collecting section 31; and a second comparing section 333-2 that compares the first data-2 and the second data-2 collected by the data collecting section 31. The test system 1200 includes a searching section 334 configured to acquire, from the first comparing section 333-1 and the second comparing section 333-2, results of comparison carried out thereby, and search for a portion where there is a defect with use of the results. Note that, in the example shown in FIG. 17, a screen display test is carried out on a system in which two reference apparatuses and two tested apparatuses operate in a related manner; however, the number of reference apparatuses and the number of tested apparatuses included in a system to be subjected to the screen display test are each not limited to two. A screen display test can be carried out on a system in which three or more reference apparatuses or three or more tested apparatuses operate in a related manner.

<<Flow of Process>>

Figure 2:
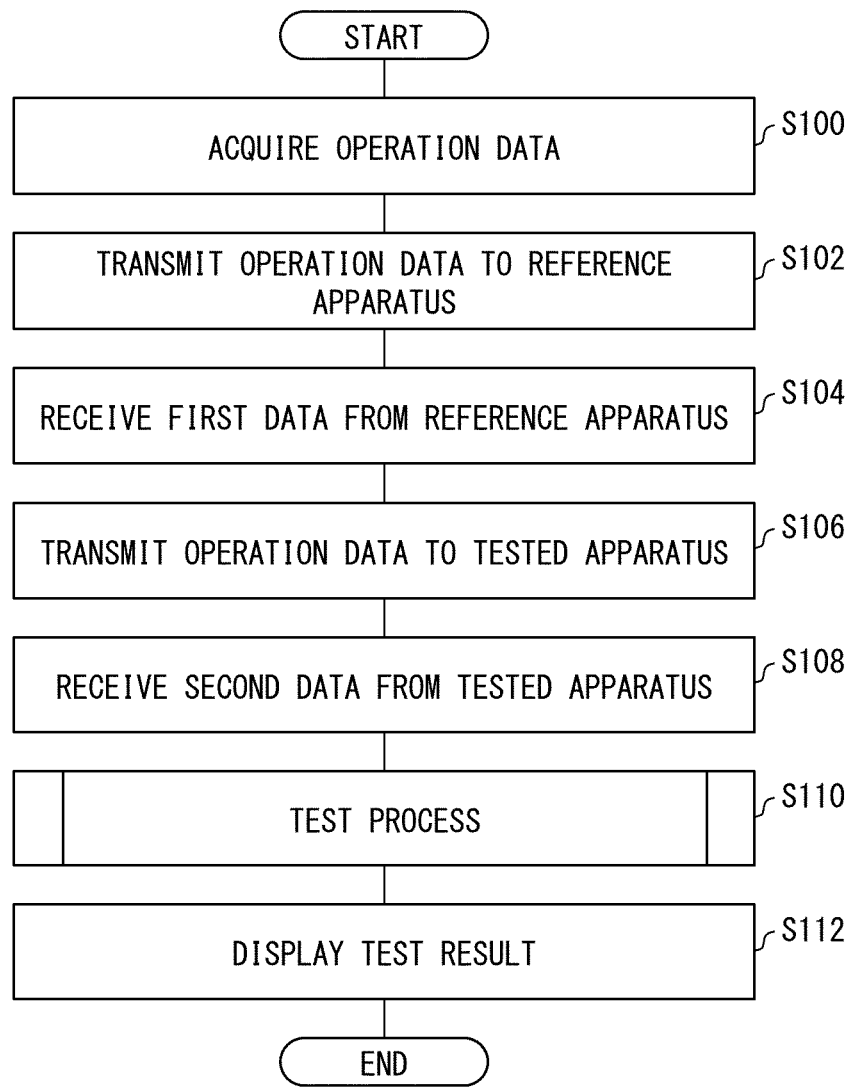
FIG. 2 is a diagram illustrating an example of a flow of a process carried out by the testing device.

FIG. 2 is a diagram illustrating an example of a flow of a process carried out by the third control section 33 of the testing device 3. The third control section 33 of the testing device 3 acquires operation data 41 from the storage device 4 at a predetermined point in time (S100). For example, the third control section 33 acquires the operation data 41 from the storage device 4 in a case where it is determined that an input operation received at the input section 34 instructs transmission of the operation data 41. The third control section 33 transmits the thus-acquired operation data 41 to the operation data output section 36.

The operation data output section 36 transmits the operation data 41 to the reference apparatus 1 (S102). The first operation data acquiring section 11 of the reference apparatus 1, upon receipt of the operation data 41, stores the operation data 41 in the first storage section 12. In a case where the first storage section 12 has operation data 41 already stored therein, the first operation data acquiring section 11 may update the operation data 41 stored in the first storage section 12. When the operation data 41 is stored in the first storage section 12 or the operation data in the first storage section 12 is updated, the first display control section 131 of the first control section 13 controls the first display section 14 to display an image based on the operation data 41 and a display program. Then, the first capturing section 132 of the first control section 13 sequentially captures images, and thereby prepares first data. The first control section 13 transmits, to the data collecting section 31 of the testing device 3, the first data prepared by the first capturing section 132.

The data collecting section 31 receives the first data from the reference apparatus 1 (S104). The data collecting section 31 stores the thus-received first data, as first data 321, in the third storage section 32.

The operation data output section 36 transmits the operation data 41 to the tested apparatus 2 (S106). The second operation data acquiring section 21 of the tested apparatus 2, upon receipt of the operation data 41, stores the operation data 41 in the second storage section 22. In a case where the second storage section 22 has operation data already stored therein, the second operation data acquiring section 21 may update the operation data 41 stored in the second storage section 22. When the operation data 41 is stored in the second storage section 22 or the operation data 41 in the second storage section 22 is updated, the second display control section 231 of the second control section 23 controls the second display section 24 to display an image based on the operation data and a display program. Then, the second capturing section 232 of the second control section 23 sequentially captures images, and thereby prepares second data. The second control section 23 transmits, to the data collecting section 31 of the testing device 3, the second data prepared by the second capturing section 232.

The data collecting section 31 receives the second data from the tested apparatus 2 (S108). The data collecting section 31 stores the thus-received second data, as second data 322, in the third storage section 32.

The third control section 33 carries out a test process at a predetermined point in time after the first data 321 and the second data 322 are stored in the third storage section 32 (S110). The test process is a process relating to a screen display test, and is composed of a series of steps starting with comparing frame images by the comparing section 333 and ending with obtaining a test result at the searching section 334. The details of the test process will be described later. The third control section 33 carries out the test process in a case where, for example, it is determined that an input operation received at the input section 34 indicates an instruction for starting the test.

Upon completion of the test process, the searching section 334 notifies the third display control section 335 of the test result. The third display control section 335 controls the third display section 351 to display the test result (S112).

According to the process shown in FIG. 2, in a case where, as a result of comparison between the first data 321 and the second data 322, respective images of the first data 321 and the second data 322 in a certain frame do not match up with each other, a search is carried out as to whether or not any of frame images, within a predetermined number of frames preceding and/or following the certain frame of one of the first data 321 and the second data 322, matches up with a base image. Then, if none of the frame images within the predetermined number of frames preceding and/or following the certain frame of the one of the first data 321 and the second data 322 matches up with the base image, a user is notified that the second data 322 is abnormal, i.e., there is a defect in display on a screen of the tested apparatus 2. This makes it possible to automatically check for defects in display on a screen of the tested apparatus 2 while tolerating differences within a certain number of frames. This makes it possible to reduce the number of false detections of defects in a screen display test.

(Variation 1 of Flow of Process)

Note that the steps S102 to S104 and the steps S106 to S108 may be carried out in parallel with each other or may be carried out in the opposite order. Specifically, the operation data output section 36 may transmit the operation data 41 to the reference apparatus 1 and to the tested apparatus 2 at any points in time, provided that the operation data 41 is transmitted to both the reference apparatus 1 and the tested apparatus 2. Also, the data collecting section 31 may receive the first data of the reference apparatus 1 first or may receive the second data of the tested apparatus 2 first, provided that the data collecting section 31 receives both the first data of the reference apparatus 1 and the second data of the tested apparatus 2.

(Variation 2 of Flow of Process)

Note that the first data acquiring section 331 and the second data acquiring section 332 may receive data at different points in time. For example, the first data acquiring section 331 may acquire the first data 321 and transmit it to the comparing section 333 in advance. In this case, the data collecting section 31 may receive the second data from the tested apparatus 2 in real time.

In a case where the above arrangement is employed, the second data acquiring section 332 may acquire the second data 322 which is temporarily stored in the third storage section 32 or may acquire the second data directly from the data collecting section 31. In either case, the second data acquiring section 332 sequentially acquires, in real time, the second data generated by the tested apparatus 2, and transmits the second data to the comparing section 333. The comparing section 333 sequentially compares (i) the first data 321 and (ii) the second data received in real time.

This makes it possible to check, in real time, whether there is a defect in the tested apparatus 2 while the tested apparatus 2 is in operation. It is therefore possible to carry out a screen display test more quickly.

<<Details of Test Process>>

Figure 3:
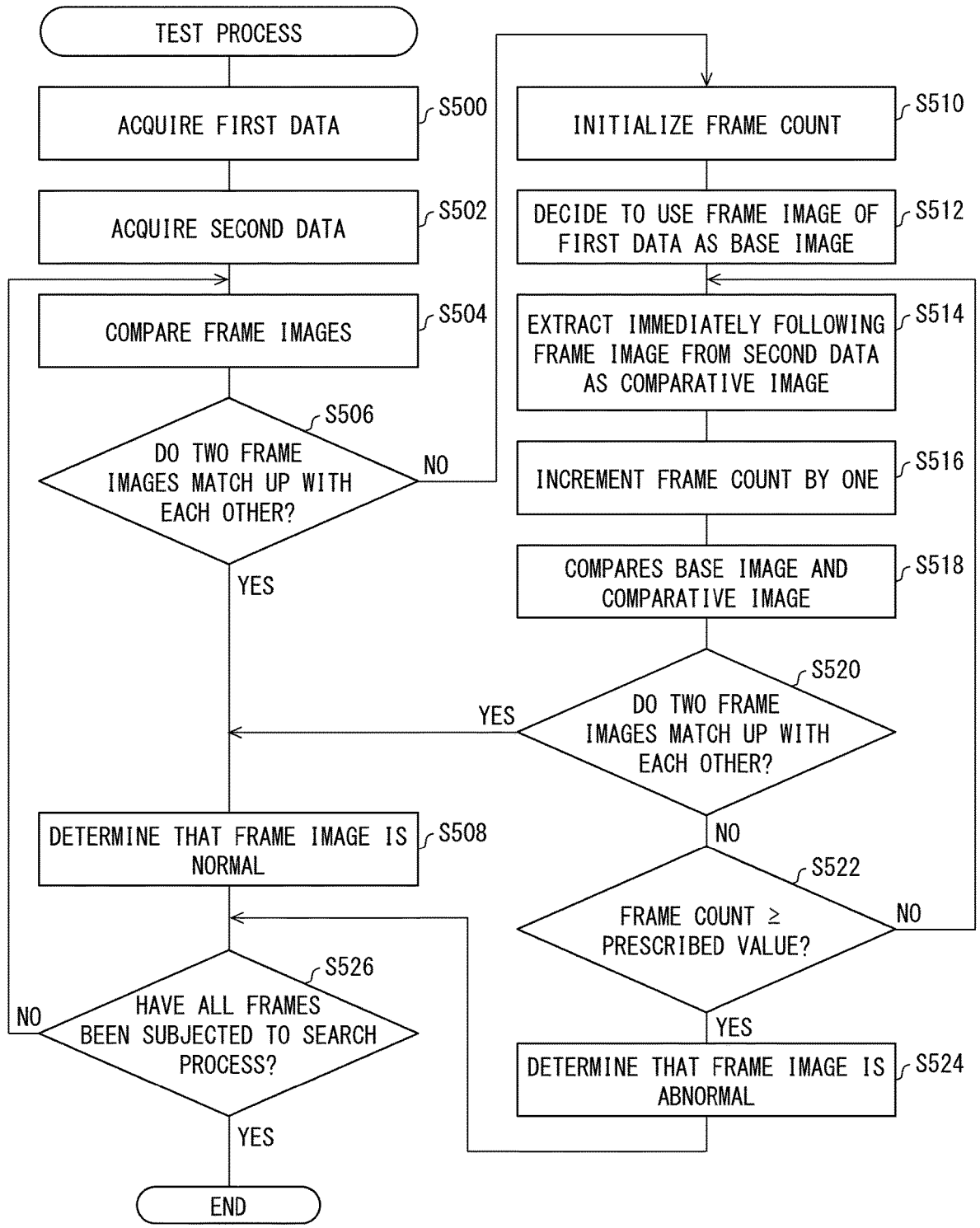
FIG. 3 is a diagram showing an example of a flow of a test process.

FIG. 3 is a diagram showing an example of a flow of a test process. Note that the example shown in FIG. 3 is a flow of a process in a case where a frame image of first data is used as a base image in a search process. Also note that the example shown in FIG. 3 is a flow of a process in a case where a search is carried out as to whether any of frame images in frames following a mismatch frame matches up with the base image.

First, the first data acquiring section 331 acquires first data 321 from the third storage section 32 (S500). The first data acquiring section 331 transmits the first data 321 to the comparing section 333. The second data acquiring section 332 acquires the second data 322 from the third storage section 32 (S502). The second data acquiring section 332 transmits the second data 322 to the comparing section 333. Note that the steps S500 and S502 may be carried out in any order.

The comparing section 333 compares a frame image of the thus-received first data 321 and a corresponding frame image of the second data 322 (S504), and thereby determines whether or not these two frame images match up with each other (S506). The comparing section 333 carries out such a comparison and determination sequentially with respect to frames from the first frame, in each of which respective frame images of the first data 321 and the second data 322, with the same frame numbers, are compared with each other. For example, the comparing section 333 compares an image in the first frame of the first data 321 and an image in the first frame of the second data 322, determines whether or not the two images match up with each other, and notifies the searching section 334 of the result of the determination.

Figure 4:
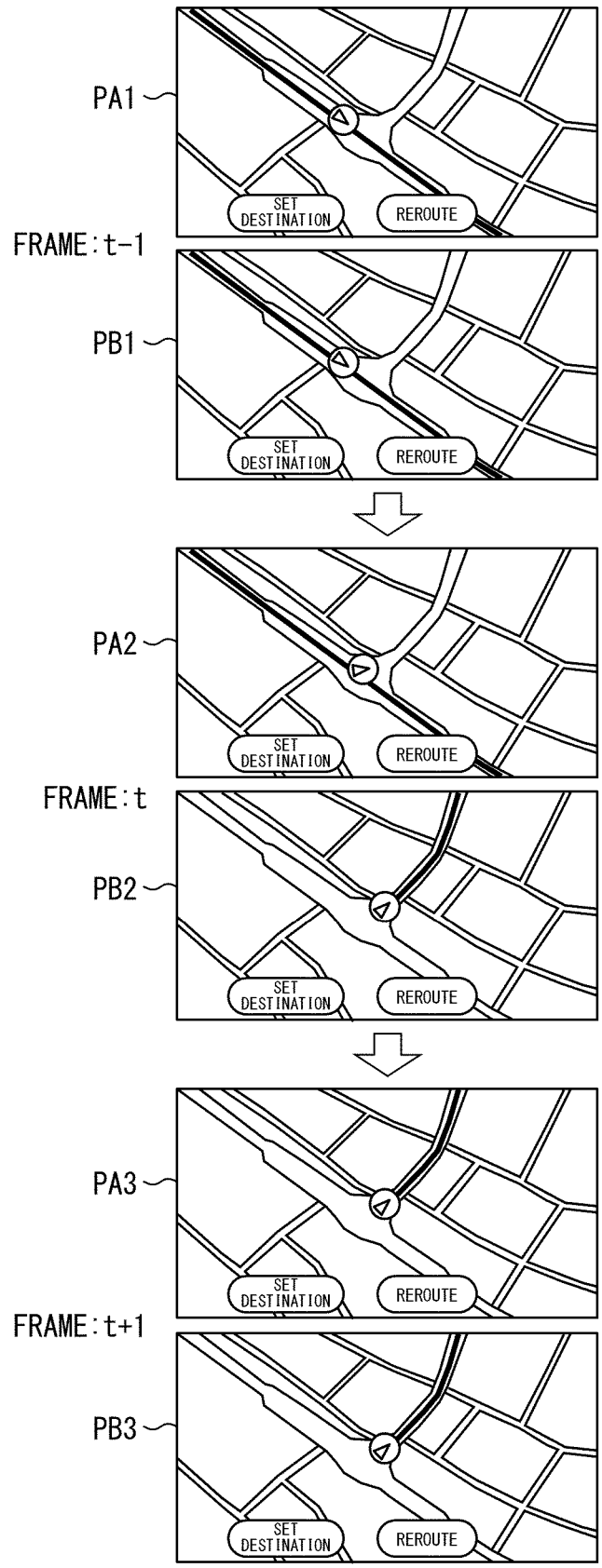
FIG. 4 schematically illustrates a comparison process.

FIG. 4 schematically illustrates a comparison process carried out by the comparing section 333. In the example shown in FIG. 4, images PA1, PA2, and PA3 are frame images of the first data 321, whereas images PB1, PB2, and PB3 are frame images of the second data 322. The comparing section 333 compares frame images in the order of frame t−1, frame t, and then frame t+1 illustrated in FIG. 4, for example. In the frame t−1, the images PA1 and PB1 match up with each other. In this case, the comparing section 333 notifies the searching section 334 that the first data 321 and the second data 322 in the frame t−1 match up with each other. On the contrary, in the frame t, the images PA2 and PB2 are different from each other. In this case, the comparing section 333 notifies the searching section 334 that the first data 321 and the second data 322 in the frame t do not match up with each other. In the frame t+1, the images PA3 and PB3 match up with each other. Therefore, the comparing section 333 notifies the searching section 334 that the first data 321 and the second data 322 in the frame t+1 match up with each other.

In a case where the result of the comparison in S504 indicates that the foregoing two frame images match up with each other (YES in S506), the searching section 334 determines that the frame image of the second data, in the frame with respect to which the comparison was carried out in S504, is normal (S508).

On the contrary, in a case where the result of the comparison in S504 indicates that the foregoing two frame images do not match up with each other (NO in S506), the searching section 334 carries out the foregoing processes (1) and (2). Specifically, the searching section 334 first initializes a frame count kept therein (S510). The initial value of the frame count is not particularly limited. Assume here that the initial value is 0 (zero).

After the initialization of the frame count, the searching section 334 decides a base image. For example, the searching section 334 decides to use a frame image of the first data as a base image (S512). Hereinafter, a frame corresponding to the base image may be referred to as "base frame".

Next, the searching section 334 extracts, from the second data, the immediately following frame image (S514). The thus-extracted frame image is referred to as a comparative image for comparison with the base image. After the extraction of the comparative image, the searching section 334 increments the frame count by one (S516). The searching section 334 compares the base image and the comparative image (S518), and thereby determines whether or not the base image and the comparative image match up with each other (S520). Note that the comparison and determination in S518 to S520 may be carried out in a similar manner to the comparison and determination carried out by the comparing section 333. Alternatively, the following arrangement may be employed: the searching section 334 causes the comparing section 333 to carry out the comparison and determination instead of the searching section 334; and the searching section 334 receives the results of the comparison and determination from the comparing section 333.

In a case where the base image and the comparative image match up with each other (YES in S520), the searching section 334 determines that the second data in the base frame is normal (S508). Specifically, the searching section 334 is configured such that, in a case where, with regard to second data received from the tested apparatus 2, the display time difference between an image of the second data and a corresponding image of the first data is equal to or less than a prescribed value (described later), the searching section 334 determines that the display time difference is not a defect. On the contrary, in a case where the base image and the comparative image do not match up with each other (NO in S520), the searching section 334 determines whether the frame count is equal to or greater than the prescribed value (S522).

In a case where the frame count is less than the prescribed value (NO in S522), the searching section 334 carries out the step S514 and the subsequent steps again. Specifically, the searching section 334 extracts, from the frame images of the second data 322, a frame image in the frame immediately following the frame of the comparative image used in S518 (the thus-extracted frame image serves as a next comparative image) (S514), increments the frame count (S516), and carries out a comparison and determination with regard to the base image and this next comparative image (S518 to S520).

On the contrary, in a case where the frame count is equal to or greater than the prescribed value (YES in S522), the searching section 334 determines that the frame image of the second data in the base frame is abnormal (S524). Note that the prescribed value in S522 corresponds to the acceptable number of frames mentioned earlier in the foregoing process (2). It is preferable that the acceptable number of frames, divided by a frame rate of the first data 321 or the second data 322, is a period shorter than 0.3 seconds.

The process shown in FIG. 3 is repeated until all the frames of the first data 321 and the second data 322 have been subjected to the search process. Specifically, after step S508 or S524, the searching section 334 determines whether or not all the frames have been subjected to the search process (S526).

In a case where not all the frames have been subjected to the search process (NO in S526), the third control section 33 carries out step S504 and the subsequent steps again. Specifically, the comparing section 333 carries out a comparison between respective frame images of the first data 321 and the second data 322 in the frame of the next frame number (S504), determines whether or not the two frame images match up with each other (S506), and notifies the searching section 334 of the result of the determination. The subsequent steps are the same as described earlier.

On the contrary, in a case where all the frames have been subjected to the search process (YES in S526), the third control section 33 ends the test process. Note that the searching section 334 may store the result of the test, as test result data 42, in the storage device 4.

(Variation 1 of Test Process)

Note that, in the search process, a search may be carried out as to whether any of frame images in frames preceding the mismatch frame matches up with the base image. In this case, in S514, the searching section 334 extracts, from the second data, a frame image in the frame immediately preceding the base frame. The thus-extracted frame image serves as a comparative image. The subsequent steps are the same as those described earlier.

It is preferable that the searching section 334 carries out a search process with respect to both the frames preceding the mismatch frame and the frames following the mismatch frame. This makes it possible to improve the accuracy of test results.

(Variation 2 of Test Process)

In the search process, a frame image of the second data may be decided as a base image. In this case, in S514, the searching section 334 reads, from the first data, an image in the frame immediately following the mismatch frame, and the thus-extracted image is used as a comparative image. The searching section 334 then carries out the subsequent steps.

(Variation 3 of Test Process)

The testing device 3 may be configured not to automatically carry out the step S504 and the subsequent steps. In this case, the first data acquiring section 331 and the second data acquiring section 332 transmit the acquired first data 321 and second data 322, respectively, to the third display control section 335. Then, the third display control section 335 causes the first data 321 and the second data 322 to be simultaneously played back in a manner that a user can compare the first data 321 and the second data 322. This allows the user to visually compare the first data 321 and the second data 322 during the playback of the first data 321 and the second data 322. Note that, in this case, the comparing section 333 and the searching section 334 are not essential to the testing device 3. The speed of simultaneous playback of the first data 321 and the second data 322 is not particularly limited, and is preferably a speed at which the data are easily visually perceptible to the user.

Figure 5:
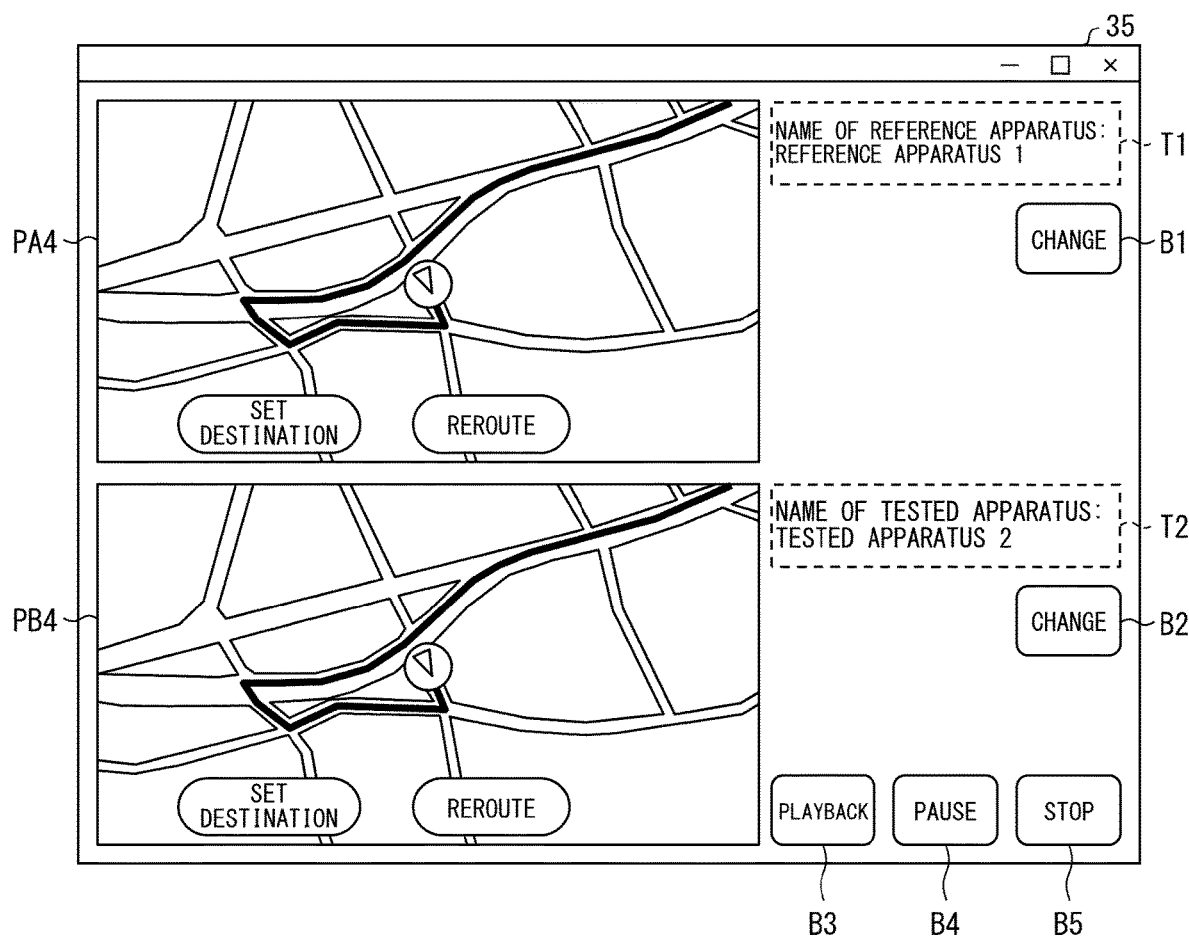
FIG. 5 illustrates an example of a display screen in a case where first data and second data are simultaneously played back.

FIG. 5 illustrates an example of a display screen of the third display section 351 in a case where the first data 321 and the second data 322 are simultaneously played back. As illustrated in FIG. 5, a moving image PA4 of the first data 321 and a moving image PB4 of the second data 322 are displayed on the third display section 351.

The third display section 351 may include an area T1 in which information for identification of the reference apparatus 1, from which the currently-displayed first data 321 is acquired, is displayed. The third display section 351 may also include an area T2 in which information for identification of the tested apparatus 2, from which the currently-displayed second data 322 is acquired, is displayed. In the example illustrated in FIG. 5, the names of the reference apparatus 1 and the tested apparatus 2 are displayed in the areas T1 and T2, respectively.

In a case where the testing device 3 is configured to be connectable to a plurality of reference apparatuses 1, the third display section 351 may have a button B1 displayed thereon for changing the displayed first data 321. In a case where an input operation to select the button B1 is carried out, the third control section 33 of the testing device 3 controls the third display section 351 to (i) display, for example, a window on which a selection is to be made as to which first data 321 to display, and (ii) allow a user to select, on the window, which first data 321 to display. The third display control section 335 may then start display of the selected first data 321.

Similarly, in a case where the testing device 3 is configured to be connectable to a plurality of tested apparatuses 2, the third display section 351 may have a button B2 displayed thereon for changing the displayed second data 322. In a case where an input operation to select the button B2 is carried out, the third control section 33 of the testing device 3 controls the third display section 351 to (i) display, for example, a window on which a selection is to be made as to which second data 322 to display, and (ii) allow a user to select, on the window, which second data 322 to display. The third display control section 335 may then start display of the selected second data 322. The third display section 351 may also have displayed thereon: a button B3 to issue an instruction for starting playback of the first data 321 and the second data 322; a button B4 to issue an instruction for pausing the playback of moving images; and a button B5 to issue an instruction for stopping the playback of the moving images.

Note that the layout of the UI, such as images, icons, entry fields, and buttons in FIG. 5, is merely an example. The images and the layout of the UI on the third display section 351 are not limited as such.

In a case where the first data 321 and the second data 322 are simultaneously played back and displayed as illustrated in FIG. 5, a user can visually check the first data 321 and the second data 322. With this, among display time differences between the reference apparatus 1 and the tested apparatus 2, only those which are large to the extent that they are perceptible to the human eye can be recognized by the user as defects. Furthermore, since the first data and the second data are simultaneously played back, the user can easily check both data visually.

(Variation 4 of Test Process)

As describe earlier, the first data 321 and the second data 322, which are generated based on the same operation data, are supposed to be moving images having the same number of frames. However, in practice, even moving images generated based on the same operation data may be displayed at different points in time from each other by several frames.

For example, when the reference apparatus 1 and the tested apparatus 2 are operated, a plurality of programs run parallel on each of the apparatuses. In so doing, there may be a slight delay in processing in which a task of a display program is processed, due to, for example, conflict between the processing in which the task of the display program is processed and processing in which a task of another program is processed. Such a delay may result in a several-frame difference in duration even between the first data and the second data which are generated based on the same operation data.

Furthermore, for example, in a case where the first capturing section 132 is configured such that the first capturing section 132 starts capture upon detection of a display control instruction sent from the first display control section 131 to the first display section 14, some images corresponding to content at the start or end of the operation data may not be captured. Similarly, for example, in a case where the second capturing section 232 is configured such that the second capturing section 232 starts capture upon detection of a display control instruction sent from the second display control section 231 to the second display section 24, some images corresponding to content at the start or end of the operation data may not be captured.

This is because there may be a time lag between (i) when the first capturing section 132 detects an instruction sent from the first display control section 131 to the first display section 14 to start displaying an image on the screen and (ii) when capture is actually started. Similarly, also in the second capturing section 232, some images corresponding to content at the start or end of the operation data may not be captured, because there may be a time lag between (i) when the second capturing section 232 detects an instruction sent from the second display control section 231 to the second display section 24 to start displaying an image on the screen and (ii) when capture is actually started.

Furthermore, even if the first display control section 131 transmits an instruction for stopping the display of the image on the screen to the first display section 14, the first display section 14 may not immediately stop the display of the image based on the operation data. For example, in a case where data of the last operation is indicative of an action to press a specific button, there may be some processing to generate a button press animation corresponding to the button pressing action.

In such a case, if the first capturing section 132 stops the capture immediately after the detection of an instruction sent from the first display control section 131 to the first display section 14 to stop the display of an image on the screen, the captured moving image may lack the last portion of the image displayed based on the operation data. For example, the captured moving image may lack a part of the foregoing animation. The same applies to the second display control section 231, the second display section 24, and the second capturing section 232. The captured moving image may lack the last portion of the image displayed based on the operation data. For example, the captured moving image may lack a part of the foregoing animation.

For the purpose of avoiding such a display time difference, the test system 600 in accordance with Embodiment 1 may carry out the following process. The same applies to test systems in accordance with the subsequent embodiments.

For example, the first display control section 131 may control the first display section 14 to display several extra frame images before starting displaying an image based on operation data. The extra frame images may be referred to as "pre-start extra frame images" for convenience of description. In this case, the first capturing section 132 starts screen capture upon detection of an instruction for starting display of the pre-start extra frame images. Similarly to the first display control section 131, the second display control section 231 may also control the second display section 24 to display pre-start extra frame images before starting displaying an image based on the operation data. In this case, the second capturing section 232 starts screen capture upon detection of an instruction for starting display of the pre-start extra frame images. With this, the first capturing section 132 and the second capturing section 232 are capable of capturing images based on the operation data from the first without lack.

Furthermore, for example, the first display control section 131 may control the first display section 14 to display several extra frame images after stopping displaying an image based on operation data. The extra frame images may be referred to as "post-end extra frame images" for convenience of description. In this case, the first capturing section 132 stops the screen capture upon detection of an instruction for stopping the display of the post-end extra frame images. Similarly to the first display control section 131, the second display control section 231 may also control the second display section 24 to display post-end extra frame images after stopping displaying an image based on the operation data. In this case, the second capturing section 232 stops the screen capture upon detection of an instruction for stopping the display of the post-end extra frame images. With this, the first capturing section 132 and the second capturing section 232 are capable of capturing images based on the operation data through to the end without lack.

It is preferable that the pre-start extra frame images and the post-end extra frame images are images that are easily distinguishable from the images based on the operation data, to the first capturing section 132 and the second capturing section 232. For example, the pre-start extra frame images and the post-end extra frame images are blank images in a solid black color, solid white color, or the like.

Furthermore, there are no particular limitations on the number of frames in which pre-start extra frame images are displayed and the number of frames in which post-end extra frame images are displayed. For example, it is preferable that the number of frames in which the pre-start extra frame images are displayed corresponds to a time period equal to or greater than the time taken for the first capturing section 132 to start screen capture. Also, it is preferable that, for example, the number of frames in which the post-end extra frame images are displayed corresponds to a period of several seconds from the issuance of an instruction for outputting an image relating to the last content in the operation data.

In a case where a moving image containing pre-start extra frame images is captured, it is preferable that the first capturing section 132 and the second capturing section 232 each delete the portion, which corresponds to the pre-start extra frame images, of the captured moving image when generating the first data and the second data, respectively. This makes it possible for the comparing section 333 to carry out a comparison process as usual. Note that the first capturing section 132 and the second capturing section 232 may or may not delete the portion corresponding to the post-end extra frame images.

In a case where captured images i.e., the first data and the second data, contain pre-start extra frame images as described above, the comparing section 333 may be configured to (i) detect the start positions of the first data 321 and the second data 322, i.e., detect the images in the respective first frames of the first data and the second data based on the operation data, to thereby make the first data 321 and the second data 322 start at the same position and then (i) start a comparison on a per-frame basis.

This makes it possible, even in a case where the first data 321 and the second data 322 contain pre-start extra frame images, for the comparing section 333 to compare an image displayed on the reference apparatus 1 based on the operation data and an image displayed on the tested apparatus 2 based on the operation data, from their first frames without lack.

Furthermore, it is possible, even in a case where the first data 321 and the second data 322 contain post-end extra frame images, for the comparing section 333 to compare an image displayed on the reference apparatus 1 based on the operation data and an image displayed on the tested apparatus 2 based on the operation data, until the last frames without lack. This makes it possible to improve the accuracy of a screen display test.

<<Examples of Application of Screen Display Test>>

A screen display test carried out by a test system in accordance with the present invention can be applied to display terminals which display maps, routes, and the like in automotive navigation systems. Hereinafter, a display terminal included in an automotive navigation system may be referred to as "automotive navigation terminal". For example, in a screen display test carried out by the test system 600 in accordance with Embodiment 1, by carrying out the following process, it is possible to carry out a test on the tested apparatus 2, which is an automotive navigation terminal.

The automotive navigation terminal regularly acquires location information and updates its current location, while displaying a map of the area around the current location. Therefore, in a case where the reference apparatus 1 and the tested apparatus 2 are automotive navigation terminals, the operation data 41 in the storage device 4 contains (i) regularly-updated location information and (ii) information indicative of a point in time at which the location information was acquired or updated. This makes it possible for the reference apparatus 1 and the tested apparatus 2 to capture images that result when the apparatuses acquire the same location information at the same time and receive the same input operation at the same time. The operation data output section 36 of the testing device 3 transmits the operation data 41 to the reference apparatus 1 and the tested apparatus 2.

The first display control section 131 of the first control section 13 and the second display control section 231 of the second control section 23, upon receipt of the operation data 41, each prepare images in accordance with pieces of location information contained in the operation data 41, with the operation data 41, and with a display program, and control the first display section 14 or the second display section 24 to display the image.

For example, the first display control section 131 and the second display control section 231 acquire data of a map of a predetermined area including the current location indicated by the location information, and control the first display section 14 and the second display section 24 to display the map based on the data. Then, the first capturing section 132 and the second capturing section 232 transmit first data and second data, respectively, to the testing device 3. The first data and the second data are images which contain map images of predetermined areas and which are generated in accordance with the pieces of location information.

Note that, in the above arrangement, the first storage section 12 and the second storage section 22 may each store map data. Alternatively, the first control section 13 and the second control section 23 may communicate with a server or the like (not illustrated) to thereby acquire map data and control the first display section 14 and the second display section 24 to display the map data. The subsequent steps are the same as those described earlier.

According to the above arrangement, it is possible to also determine if there is a defect in how the display on the screen changes with changes in location information. For example, it is possible to identify a delayed reflection of location information on the map image displayed on the tested apparatus 2.

<<Display of Test Result>>

Figure 6:
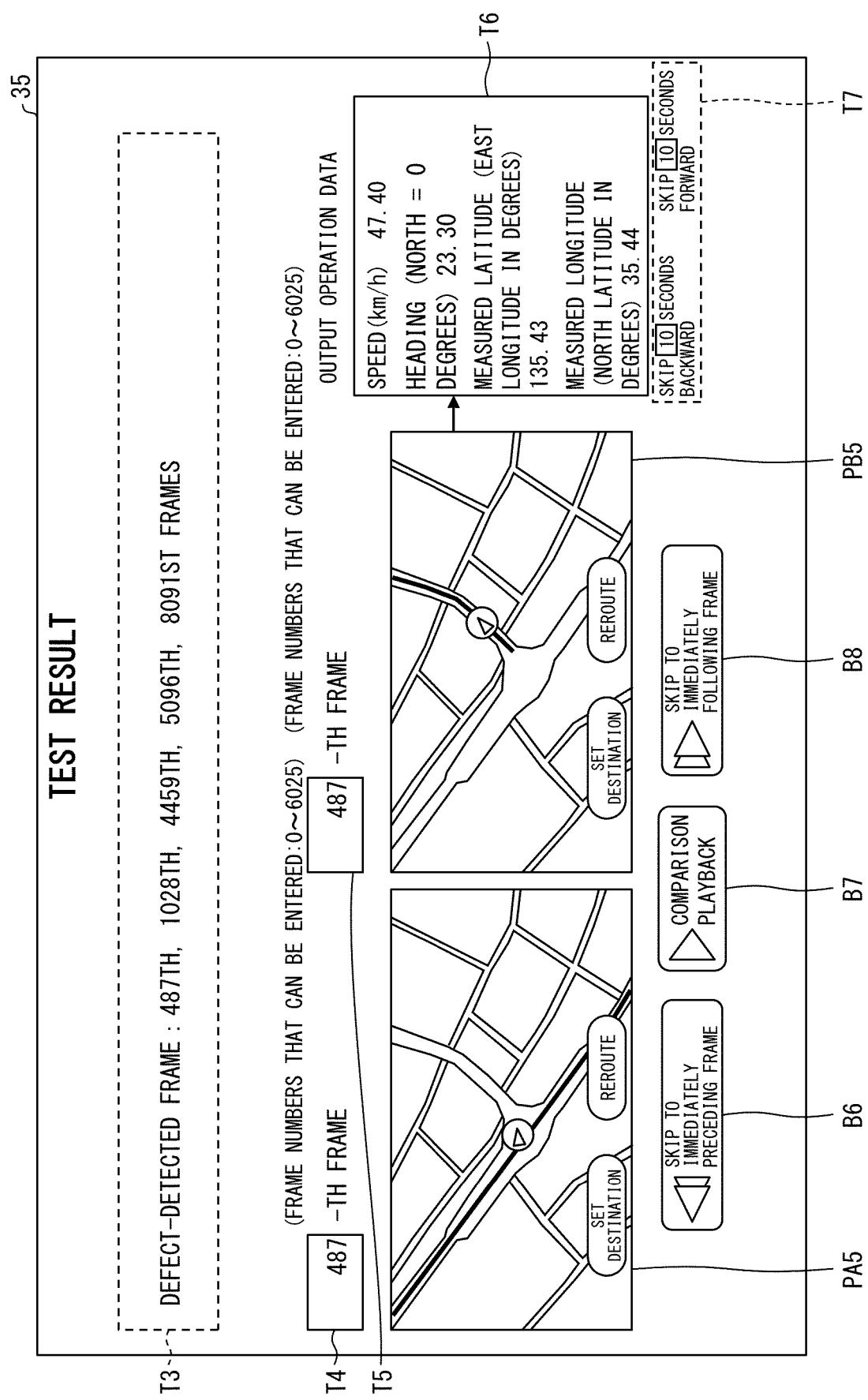
FIG. 6 illustrates an example of a test result screen.

FIG. 6 illustrates an example of a test result screen. The test result screen is a screen that is displayed on the third display section 351 of the testing device 3 and that shows the results of a screen display test. Note that the example illustrated in FIG. 6 is a test result screen in a case where the reference apparatus 1 and the tested apparatus 2 are the foregoing automotive navigation terminals.

The test result screen is displayed by the third display control section 335 at least in a case where an abnormality has been detected in any of the frames of the second data 322. In other words, the test result screen is displayed in a case where none of the frame images in the acceptable number of frames preceding and/or following a search subject image in a base frame matches up with the base image. The test result screen is not particularly limited as to its screen layout, provided that the test result screen is capable of at least notifying a user that there is a defect in the second data.

In a case of the example illustrated in FIG. 6, the frame numbers of the frames that have been determined as having an abnormality in the second data 322 are displayed in an area T3 of the test result screen. In other words, the frame numbers of base images, with regard to each of which none of the frame images in the acceptable number of frames preceding and/or following the search subject image matches up with the base image, are displayed in the area T3. As such, the frame numbers of the frames which have been determined as having an abnormality are displayed, and thereby a user can easily know where defects are.

The test result screen also has a frame image PA5 of the first data 321 and a frame image PB5 of the second data 322 displayed thereon. In boxes T4 and T5, the frame numbers of the currently displayed frames of the first data 321 and the second data 322 are displayed. The numbers shown in the boxes T4 and T5 can be changed by a user input. The images PA5 and PB5 displayed on the test result screen are those corresponding to the numbers in the boxes T4 and T5. Note that, as illustrated in FIG. 6, the numbers that can be entered in the boxes T4 and T5, i.e., information indicative of the total number of frames of the first data 321 and the second data 322, may be additionally displayed.

The first data 321 and the second data 322 may be played back on the test result screen on a frame-by-frame basis such that frame images with the same frame number are displayed at a time. In this arrangement, the test result screen includes a button B7 to issue an instruction for playing back these moving images. In a case where an input operation is carried out by pressing the button B7, the third display control section 335 controls the third display section 351 to simultaneously play back and display the first data 321 and the second data 322. The playback speed is not particularly limited, and is preferably a speed at which the data are easily visually perceptible to the user.

The test result screen may also include (i) a button B6 for frame-by-frame backward playback of the first data 321 and the second data 322 and (ii) a button B8 for frame-by-frame forward playback of the first data 321 and the second data 322. The button B6 is a button to issue an instruction for playing back the frame immediately preceding the currently-displayed frame. The button B8 is a button to issue an instruction for playing back the frame immediately following the currently displayed frame.

Note that which part of the first data 321 and the second data 322 to play back may be designated in terms of time. For example, the following arrangement may be employed: by entering the number of seconds as shown in an area T7 of FIG. 6, it is possible to skip back or forward by frames corresponding to the entered number of seconds.

The test result screen may also have displayed thereon operation data 41 corresponding to the currently played-back first data 321 and second data 322. For example, as shown in an area T6 in FIG. 6, content of operations carried out when the currently-displayed frames of the first data 321 and the second data 322 were captured may be displayed in the form of a list.

Note that, even in a case where none of the frames of the second data 322 have any abnormality, i.e., even in a case where there are no defects in the second data 322, the third display control section 335 may control the third display section 351 to display the test result screen indicating that there are no defects. In this case, the area T3 may be left blank.

Embodiment 2

According to a test system in accordance with the present invention, first data and operation data may be received at the same point in time from a reference apparatus 1. The following description will discuss Embodiment 2 of the present invention. For convenience of description, members having functions identical to those discussed in Embodiment 1 are assigned identical referential numerals, and their descriptions are omitted here. The same also applies to the subsequent embodiments.

Figure 7:
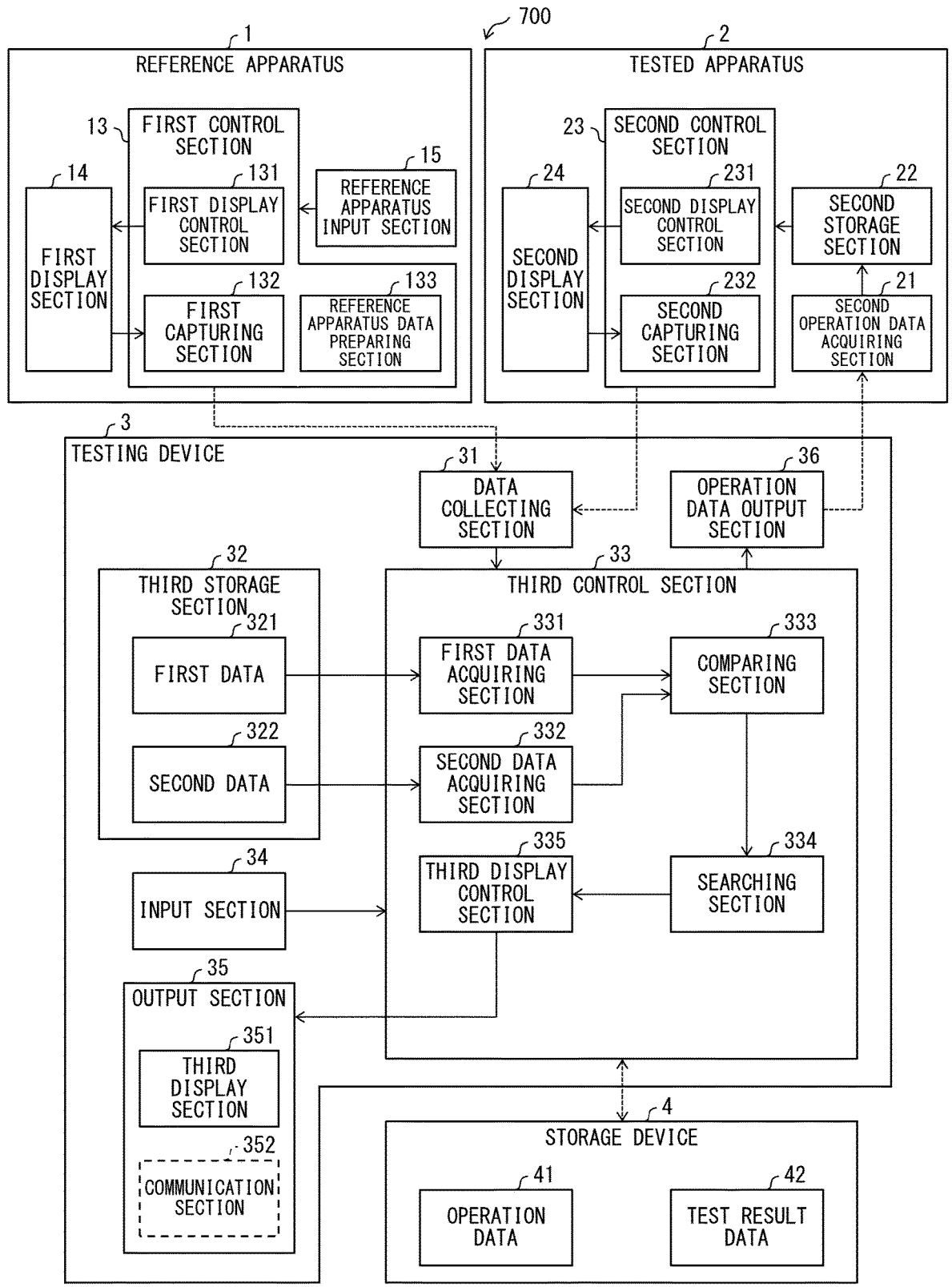
FIG. 7 is a block diagram illustrating a configuration of main parts of apparatuses and devices included in a test system in accordance with Embodiment 2.

FIG. 7 is a block diagram illustrating a configuration of main parts of apparatuses and devices included in a test system 700 in accordance with Embodiment 2. The test system 700 is different from the test system 600 in accordance with Embodiment 1 in that the reference apparatus 1 does not include the first operation data acquiring section 11 and the first storage section 12 but includes a reference apparatus input section 15 and a reference apparatus data preparing section 133.

The reference apparatus input section 15 receives a user input operation on the reference apparatus 1. The reference apparatus input section 15 transmits content of the input operation to the first control section 13. Note that there is no particular limitation on a specific configuration of the reference apparatus input section 15. For example, the reference apparatus input section 15 may be configured integrally with the first display section 14 to form a touch panel display.

The first control section 13 identifies the content of an instruction indicated by the input operation transmitted from the reference apparatus input section 15, and, in accordance with the content of the instruction, controls a relevant section(s) of the reference apparatus 1. For example, the first display control section 131 controls the first display section 14 to display an image corresponding to the content of the instruction.

The reference apparatus data preparing section 133 of the first control section 13 prepares operation data based on the user input operation received via the reference apparatus input section 15. There is no particular limitation on a point in time at which the reference apparatus data preparing section 133 prepares the operation data. For example, the following arrangement may be employed: while the first display control section 131 is controlling the first display section 14 to display an image, the reference apparatus data preparing section 133 (i) identifies the content of the user's instruction relating to image display, i.e., the content of the input operation, and the point in time at which the input operation was carried out, and (ii) prepares the operation data that contains the content of the input operation and the point in time at which the input operation was carried out. The reference apparatus data preparing section 133 transmits the thus-prepared operation data to the testing device 3. Note that the operation data may be transmitted to the testing device 3 together with the first data or may be transmitted to the testing device 3 separately from the first data.

<<Flow of Process>>

Figure 8:
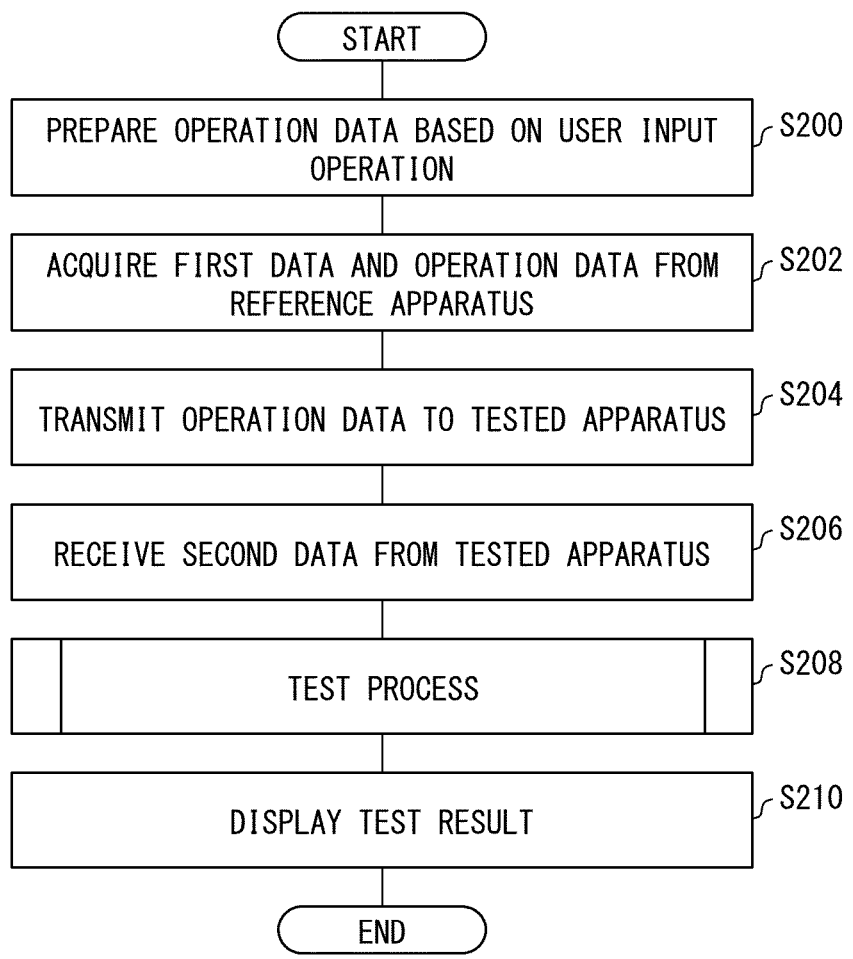
FIG. 8 is a diagram illustrating an example of a flow of a process carried out by the test system in accordance with Embodiment 2.

FIG. 8 is a diagram illustrating an example of a flow of a process carried out by the test system 700. FIG. 8 is different from the flow of a process shown in Embodiment 1 and FIG. 2 in that the process of FIG. 8 includes steps S200 and S202. Note that steps S204 to S210 in FIG. 8 are the same as steps S106 to S112 in FIG. 2, and therefore their descriptions are omitted here.

First, the reference apparatus 1 receives a series of user input operations relating to display on a screen via the reference apparatus input section 15. A screen display test is carried out on images that are displayed on the reference apparatus 1 and the tested apparatus 2 in accordance with the series of input operations.

The first control section 13 identifies content of instructions indicated by the input operations received at the reference apparatus input section 15. The first display control section 131 controls the first display section 14 to display images in accordance with the content of the instructions. On the other hand, the reference apparatus data preparing section 133 prepares operation data based on the user input operations (S200). For example, the reference apparatus data preparing section 133 identifies content of instructions, i.e., the content of the user input operations, and points in time at which the instructions were received, i.e., points in time at which the input operations were carried out, and prepares operation data that contains the content of the instructions and the point in time at which the input operations were carried out.

The reference apparatus data preparing section 133 transmits the thus-prepared operation data to the testing device 3. Furthermore, as with the case of Embodiment 1, the first capturing section 132 prepares first data and transmits the first data to the testing device 3. The data collecting section 31 of the testing device 3 acquires the first data and the operation data from the reference apparatus 1 (S202). The data collecting section 31 transmits the thus-acquired first data and operation data to the third control section 33.

The third control section 33 stores the first data, as first data 321, in the third storage section 32. The third control section 33 also stores the operation data, as operation data 41, in the storage device 4. The rest of the process flow is the same as that of the test system 600 in accordance with Embodiment 1.

According to the process shown in FIG. 8, it is possible to acquire both the first data and the operation data from the reference apparatus 1. The operation data acquired here is data indicative of a user input operation actually carried out on the reference apparatus 1 in actual operation. Therefore, according to the process shown in FIG. 8, it is possible to carry out a screen display test using operation data that is indicative of an input operation actually carried out on the reference apparatus 1 in actual use. This makes it possible to carry out a screen display test using appropriate operation data, and thus improves the accuracy of the test.

Note that, in a case where the reference apparatus 1 is a device which displays an image including a map image of a predetermined area generated in accordance with regularly-updated location information (an example of such a device is an automotive navigation terminal), it is preferable that operation data is obtained in the following manner. Specifically, it is preferable that (i) an automobile with the reference apparatus 1 installed thereon is actually driven along a route that corresponds to a map area for use in a screen display test and (ii) a user carries out an input operation on the reference apparatus 1 while the automobile is running. This makes it possible to prepare operation data that contains (a) location information regularly acquired by a GPS receiver (not illustrated) or the first control section 13 having the function of a GPS receiver while the automobile is running, (b) points in time at which pieces of location information were acquired, (c) content of the input operation, and (d) a point in time at which the input operation was carried out.

<<Examples of Application of Screen Display Test>>

The test system 700 in accordance with Embodiment 2 is also capable of carrying out a test on the tested apparatus 2 which is an automotive navigation terminal. In a case where a test is carried out on the tested apparatus 2 which is an automotive navigation terminal in Embodiment 2, the reference apparatus 1 includes a GPS receiver. The GPS receiver receives signals from GPS satellites and thereby regularly receives information indicative of the current location of the reference apparatus 1. The first control section 13 regularly acquires, from the GPS receiver, information indicative of the current location of the reference apparatus 1. With this, the location information indicative of the current location of the reference apparatus 1 is updated regularly. Note that the first control section 13 may function also as the GPS receiver.

The reference apparatus data preparing section 133 of the reference apparatus 1 prepares operation data based on a user input operation. The operation data prepared by the reference apparatus data preparing section 133 here contains (i) the location information received from the GPS receiver and (ii) information indicative of a point in time at which the location information was acquired. The reference apparatus data preparing section 133 transmits the thus-prepared operation data to the testing device 3. The testing device 3 stores the received operation data 41 in the storage device 4. With this, the storage device 4 stores the operation data 41 that contains (i) regularly-updated location information and (ii) information indicative of a point in time at which the location information was acquired or updated. The rest of the process is the same as that in a case where, in the test system 600 in accordance with Embodiment 1, a test is carried out on the tested apparatus 2 which is an automotive navigation terminal.

Embodiment 3

Figure 9:
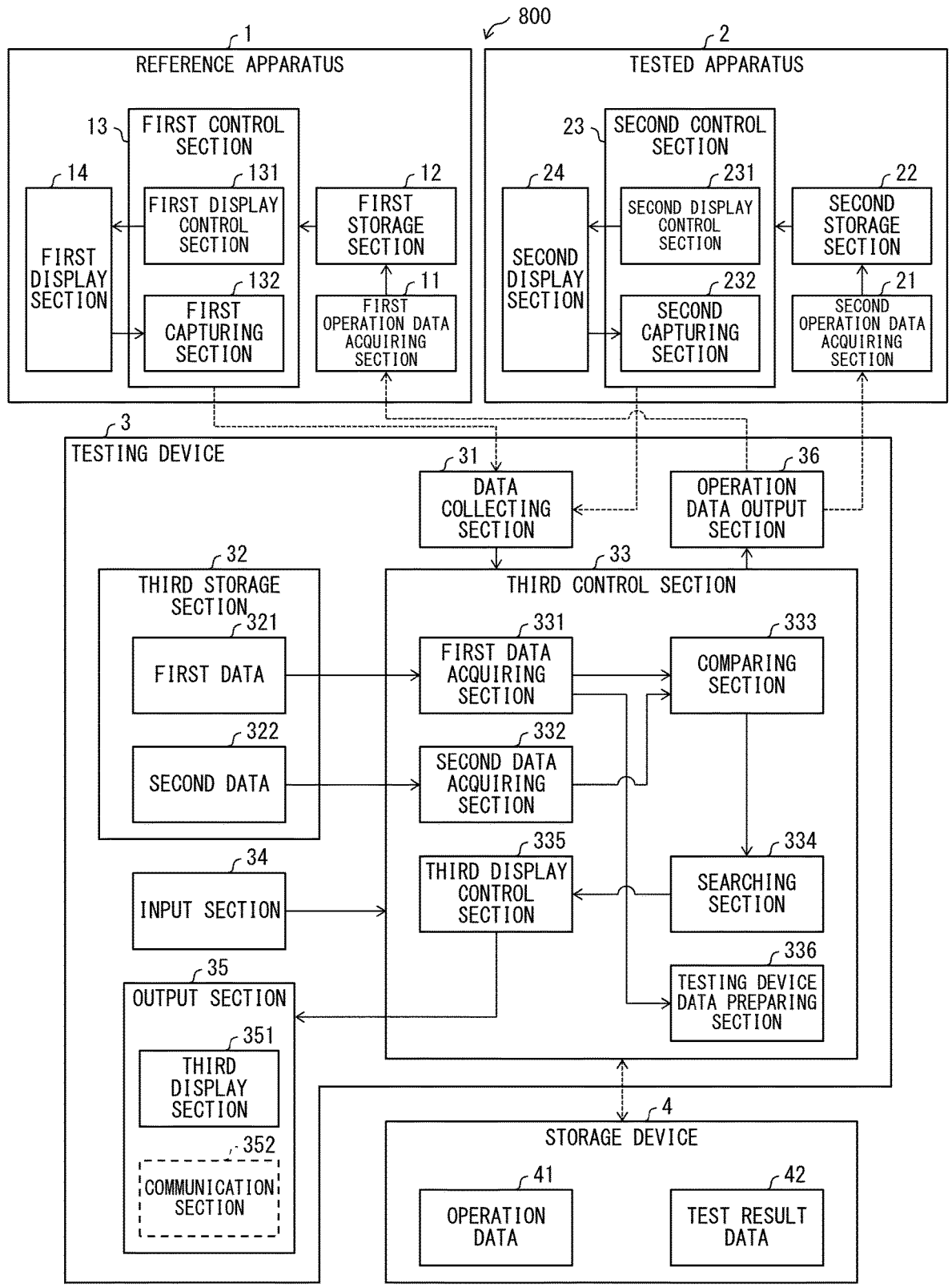
FIG. 9 is a block diagram illustrating a configuration of main parts of apparatuses and devices included in a test system in accordance with Embodiment 3.

A test system in accordance with the present invention may be configured to be capable of preparing and editing operation data on the testing device 3. The following description will discuss Embodiment 3 of the present invention. FIG. 9 is a block diagram illustrating a configuration of main parts of apparatuses and devices included in a test system 800 in accordance with Embodiment 3. The test system 800 is different from the test systems 600 and 700 in that the test system 800 includes a testing device data preparing section 336.

The testing device data preparing section 336 prepares operation data in accordance with at least one of (i) second data 322 and (ii) a user input operation on the input section 34. The testing device data preparing section 336 stores the thus-prepared operation data, as operation data 41, in the storage device 4.

<<Flow of Process>>

Figure 10:
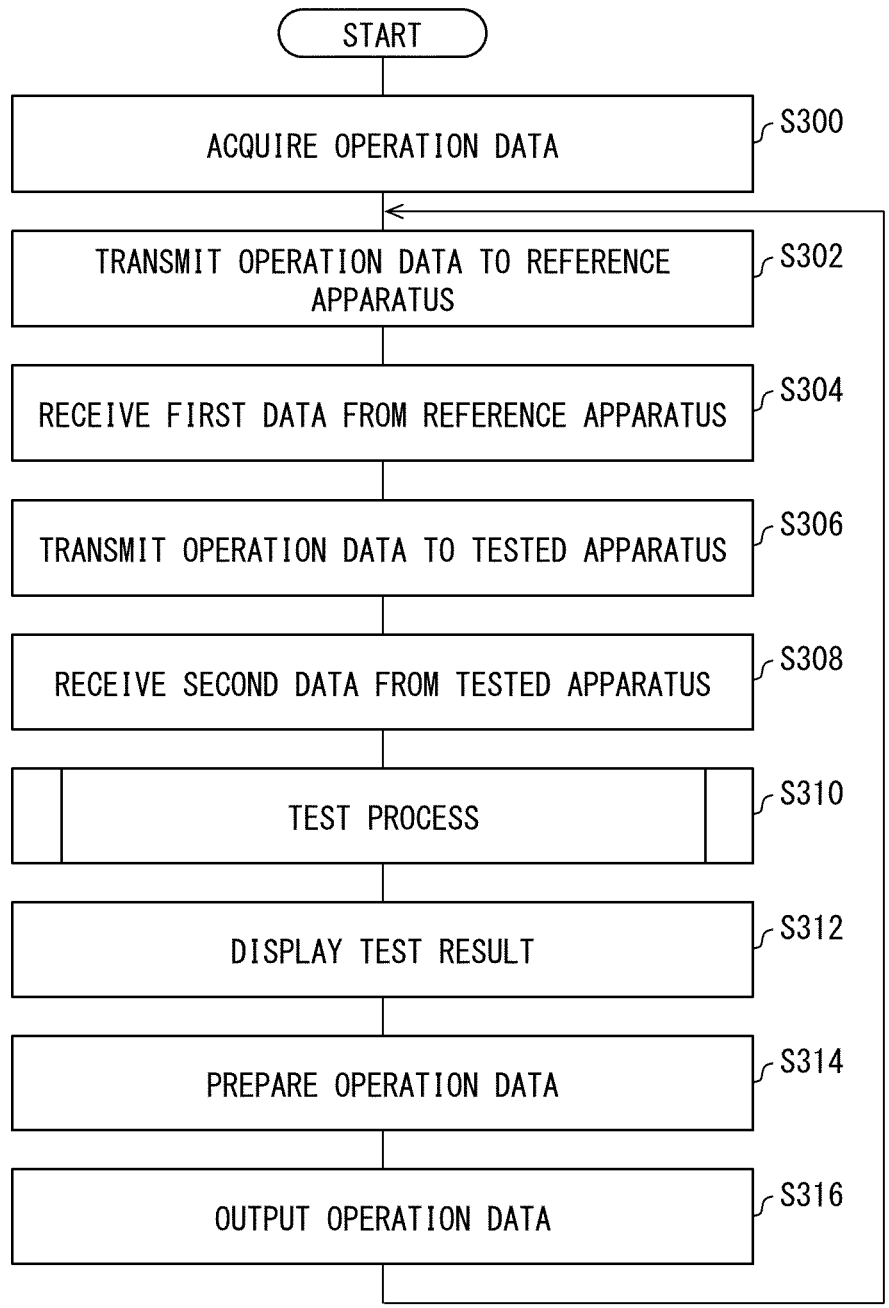
FIG. 10 is a diagram illustrating an example of a flow of a process carried out by the testing device.

FIG. 10 is a diagram illustrating an example of a flow of a process carried out by the testing device 3. FIG. 10 is different from the flow of a process shown in Embodiment 1 and FIG. 2 in that the process of FIG. 10 includes steps S314 and S316. Note that steps S300 to S312 in FIG. 10 are the same as steps S100 to S112 in FIG. 2, and therefore their descriptions are omitted here.

After completion of a test process (S310), the testing device data preparing section 336 prepares operation data based on second data that has been subjected to the test process (S314). Note that steps S314 to S316 and step S312 may be carried out in any order. The testing device data preparing section 336 stores the thus-prepared operation data, as operation data 41, in the storage device 4.

Then, the third control section 33 reads the operation data 41 from the storage device 4 at a predetermined point in time, and transmits the operation data 41 to the operation data output section 36. The operation data output section 36 transmits the operation data 41 to the reference apparatus 1 (S302).

According to the process shown in FIG. 10, it is possible, based on the result of the screen display test, to prepare operation data again based on at least one of (i) second data 322 and (ii) a user input operation, and possible to carry out a screen display test again with use of the thus-prepared another operation data. This makes it possible to carry out the test more closely, and thus possible to improve the accuracy of test results.

Note that the test system 800 in accordance with Embodiment 3 is also capable of carrying out a test on the tested apparatus 2 which is an automotive navigation terminal. With regard to a specific procedure of the process, any of the processes discussed in Embodiments 1 and 2 may be employed. Also in test systems in accordance with the subsequent embodiments, it is also possible to carry out a test on the tested apparatus 2 which is an automotive navigation terminal, by employing any of the processes discussed in Embodiments 1 and 2.

Embodiment 4

A test system in accordance with the present invention may be arranged such that: moving image data captured on a tested apparatus 2 before updating a display program is used as first data; and moving image data captured on the tested apparatus 2 after updating the display program is used as second data. The testing device 3 may acquire the first data and the second data and then carry out comparison and search processes. The following description will discuss Embodiment 4 of the present invention.

Figure 11:
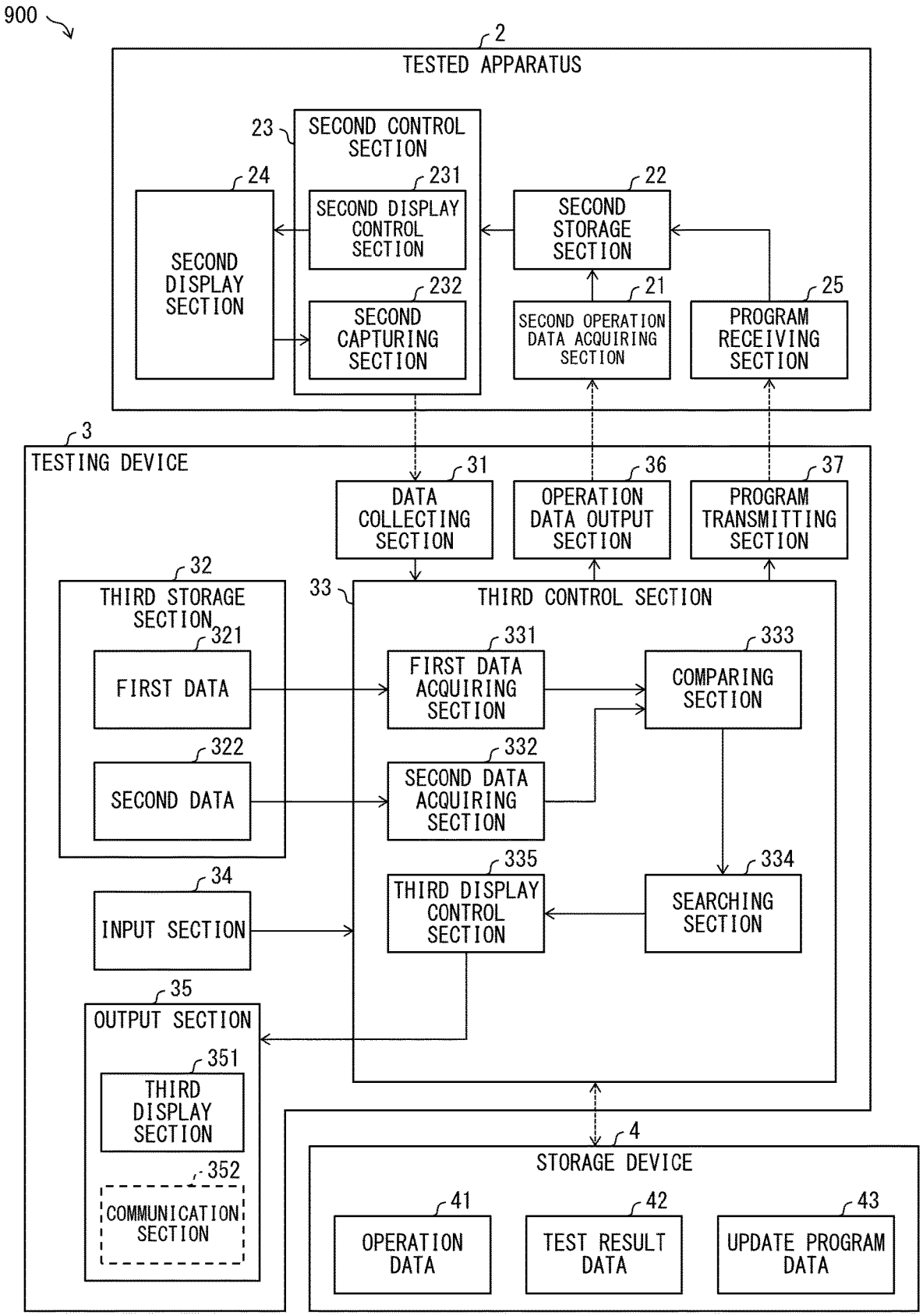
FIG. 11 is a block diagram illustrating a configuration of main parts of apparatuses and devices included in a test system in accordance with Embodiment 4.

FIG. 11 is a block diagram illustrating a configuration of main parts of apparatuses and devices included in a test system 900 in accordance with Embodiment 4. The test system 900 is different from the test systems 600, 700, and 800 in that the test system 900 does not include the reference apparatus 1, that the tested apparatus 2 includes a program receiving section 25, that the testing device 3 includes a program transmitting section 37, and that the storage device 4 includes update program data 43.

The update program data 43 in the storage device 4 is program data for updating a display program on the tested apparatus 2. The update program data 43 may be data indicative of the entirety of a display program for the tested apparatus 2 or data indicative of only a change or addition to the display program on the tested apparatus 2. The update program data 43 may be prepared on an external device not included in the test system 900 and then stored in the storage device 4 or may be prepared on the third control section 33 of the testing device 3 and then stored in the storage device 4.

The third control section 33 of the testing device 3 reads the update program data 43 from the storage device 4 at a predetermined point in time, and transmits the update program data 43 to the program transmitting section 37. There is no particular limitation on the predetermined point in time. For example, in a case where it is determined that the input section 34 has received an input operation indicative of an instruction for updating the display program on the tested apparatus 2, the third control section 33 reads the update program data 43 from the storage device 4 and transmits the update program data 43 to the program transmitting section 37.

The program transmitting section 37 transmits, to the tested apparatus 2, the update program data 43 received from the third control section 33. The program receiving section 25 of the tested apparatus 2 receives the update program data 43, and stores the update program data 43 in the second storage section 22. With this, the display program in the second storage section 22 is updated.

<<Flow of Process>>

Figure 12:
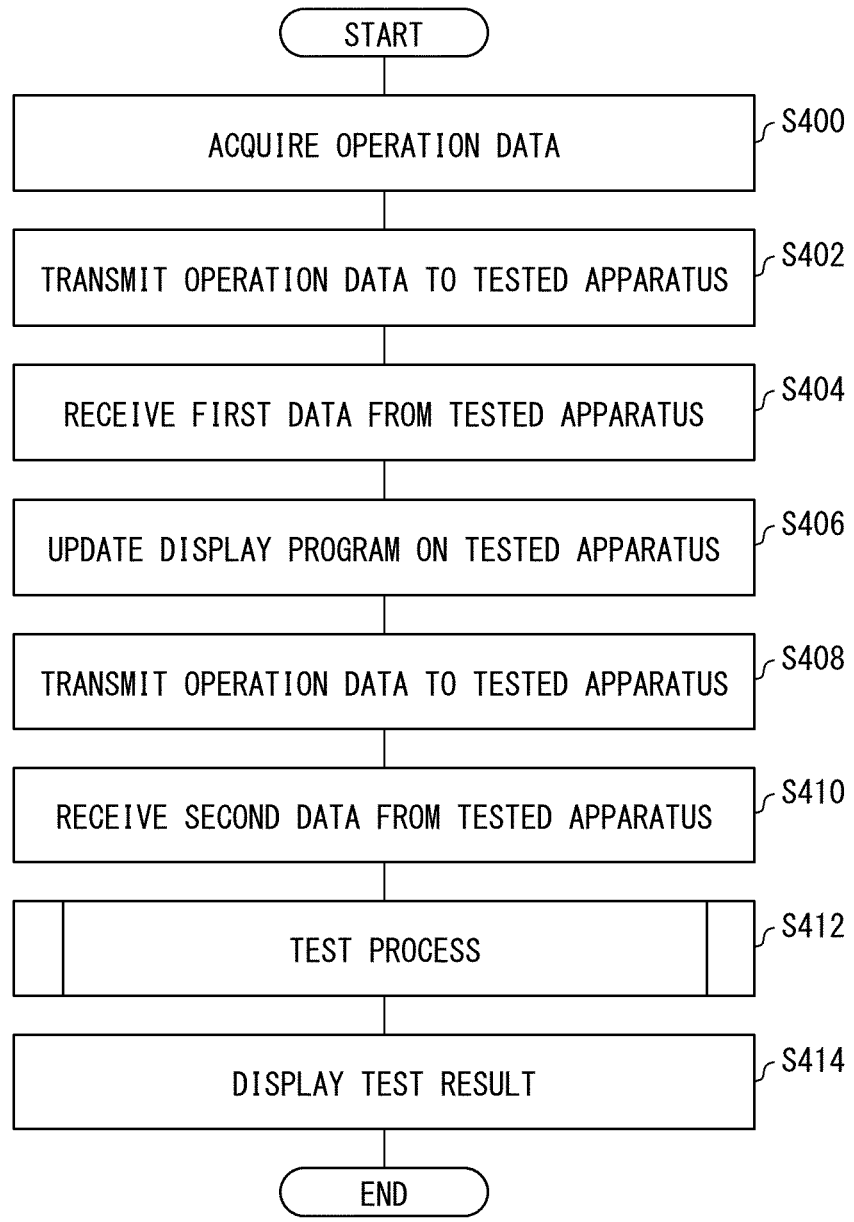
FIG. 12 is a diagram illustrating an example of a flow of a process carried out by the testing device.

FIG. 12 is a diagram illustrating an example of a flow of a process carried out by the third control section 33 of the testing device 3. FIG. 12 is different from the flow of a process shown in Embodiment 1 and FIG. 2 in that the process of FIG. 12 includes steps S402 to S410. Note that steps S400 and S408 to S414 in FIG. 12 are the same as steps S100 and S106 to S112 in FIG. 2, and therefore their descriptions are omitted here.

The third control section 33 reads the operation data 41 from the storage device 4 at a predetermined point in time, and transmits the operation data 41 to the operation data output section 36. The operation data output section 36 transmits the operation data 41 to the tested apparatus 2 (S402).

Upon receipt of the operation data 41, the second operation data acquiring section 21 of the tested apparatus 2 stores the operation data 41 in the second storage section 22. Then, the second display control section 231 of the second control section 23 controls the second display section 24 to display an image based on the operation data 41 and the display program which are stored in the second storage section 22. The second capturing section 232 captures data outputted by the second display control section 231 on the second display section 24, and transmits the thus-captured data, as first data, to the testing device 3.

The data collecting section 31 receives the first data from the tested apparatus 2 (S404). After that, the third control section 33 updates the display program on the tested apparatus 2 at a predetermined point in time. Specifically, the third control section 33 reads the update program data 43 from the storage device 4, and transmits the update program data 43 to the program transmitting section 37. The program transmitting section 37 transmits the update program data 43 to the tested apparatus 2. The program receiving section 25 of the tested apparatus 2 receives the update program data 43, and stores the update program data 43 in the second storage section 22. That is, the display program on the tested apparatus 2 is updated (S406). The rest of the process is the same as step S106 and the subsequent steps of Embodiment 1.

According to the process shown in FIG. 12, it is possible to check for defects in display on a screen which resulted from updating the display program on the tested apparatus 2.

Embodiment 5

A testing device included in a test system in accordance with the present invention may include a different part identifying section 337. The different part identifying section 337 is configured such that, in a case where there is a frame in which the first data 321 and the second data 322 do not match up with each other, the different part identifying section 337 identifies which part(s) is/are different between a frame image of the first data 321 in that frame and a corresponding frame image of the second data 322 in that frame. The searching section 334 may be configured to decide, in accordance with where the different part identified by the different part identifying section 337 is located within the frame images, the number of frames within which a difference is tolerated, i.e., the "prescribed value" in FIG. 3 of Embodiment 1. The following description will discuss Embodiment 5 of the present invention.

Figure 13:
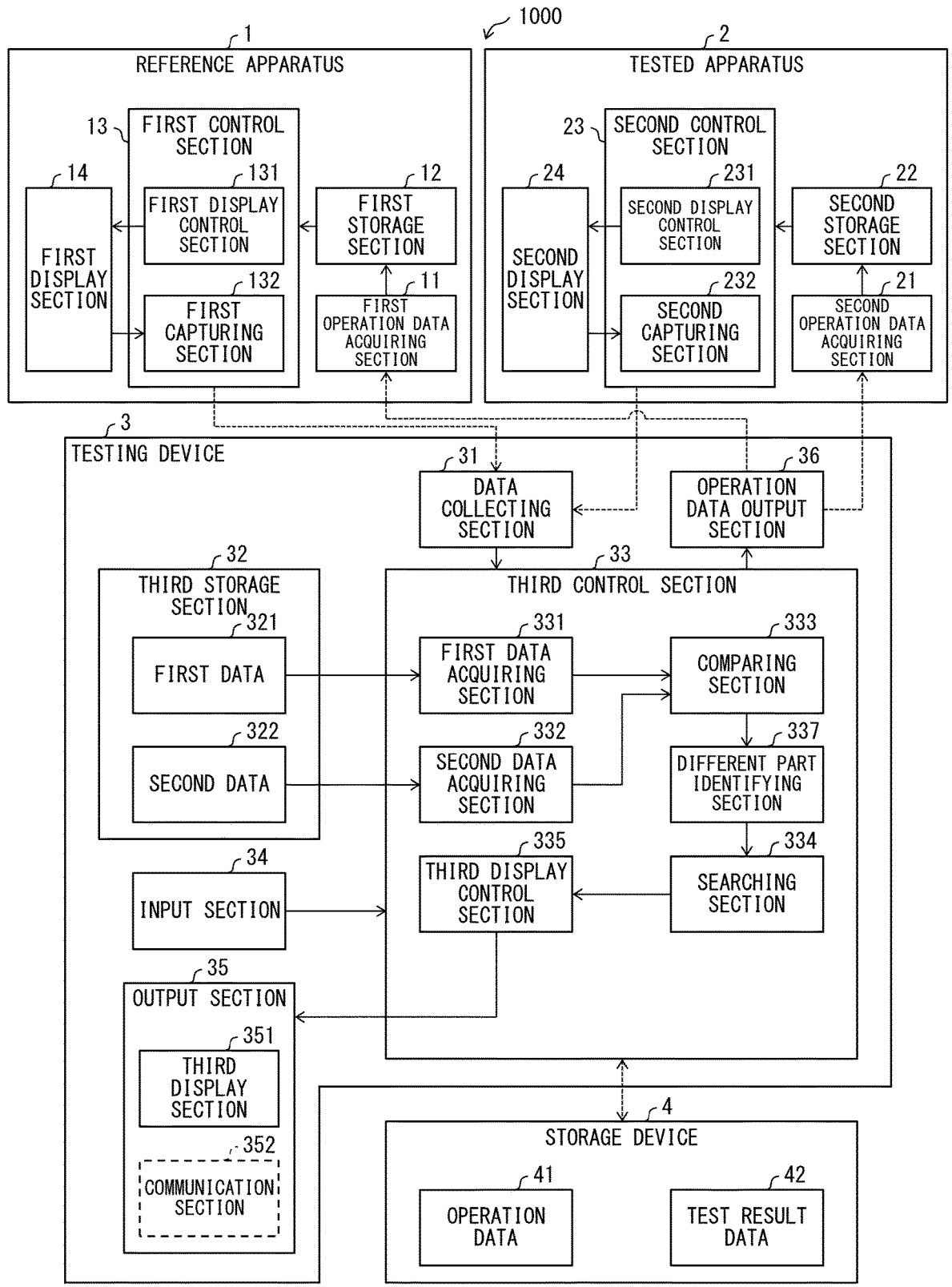
FIG. 13 is a block diagram illustrating a configuration of main pats of apparatuses and devices included in a test system in accordance with Embodiment 5.

FIG. 13 is a block diagram illustrating a configuration of main pats of apparatuses and devices included in a test system 1000 in accordance with Embodiment 5. The test system 1000 is different from the test systems 600, 700, 800, and 900 that the testing device 3 includes the different part identifying section 337.

The different part identifying section 337 is configured such that, with regard to a frame that has been determined as a mismatch frame as a result of comparison by the comparing section 333, the different part identifying section 337 identifies which part(s) is/are different between a frame image of the first data 321 in that frame and a corresponding frame image of the second data 322 in that frame. Note that the term "different part" herein may refer to a certain point on an image or an area such as an area where a specific UI object is displayed, a specific region on a map, or the like area.

The different part identifying section 337 notifies the searching section 334 of the thus-identified different part. The searching section 334 changes, in accordance with the different part, the acceptable number of frames for use in the process (2) of the search process discussed in Embodiment 1. For example, in a case where the different part is an area in which a specific UI object is displayed, the acceptable number of frames for this area may be set smaller than that for the other areas. For example, an image of a UI object representing a specific text is always located at the same place regardless of a user input operation, changes of parameters, and the like. When the acceptable number of frames is set small for an area where display time differences resulting from various condition changes are supposed to be less likely to occur whereas the acceptable number of frames for the other areas is set large as described above, a test process can be carried out on an image displayed on the tested apparatus 2 in a manner that takes into consideration the display load that differs between areas of the image. This makes it possible to improve the accuracy of a screen display test.

Embodiment 6

The test result data 42 in a test system in accordance with the present invention may include first data 321 and second data 322 corresponding to test results. In this arrangement, the third display control section 335 of the testing device 3 may control the third display section 351 to display a screen that contains (i) information indicative of which part of the second data 322 has a defect and (ii) moving images of the first data 321 and the second data 322. Such a screen is hereinafter referred to as "result playback screen". The following description will discuss Embodiment 6 of the present invention.

Figure 14:
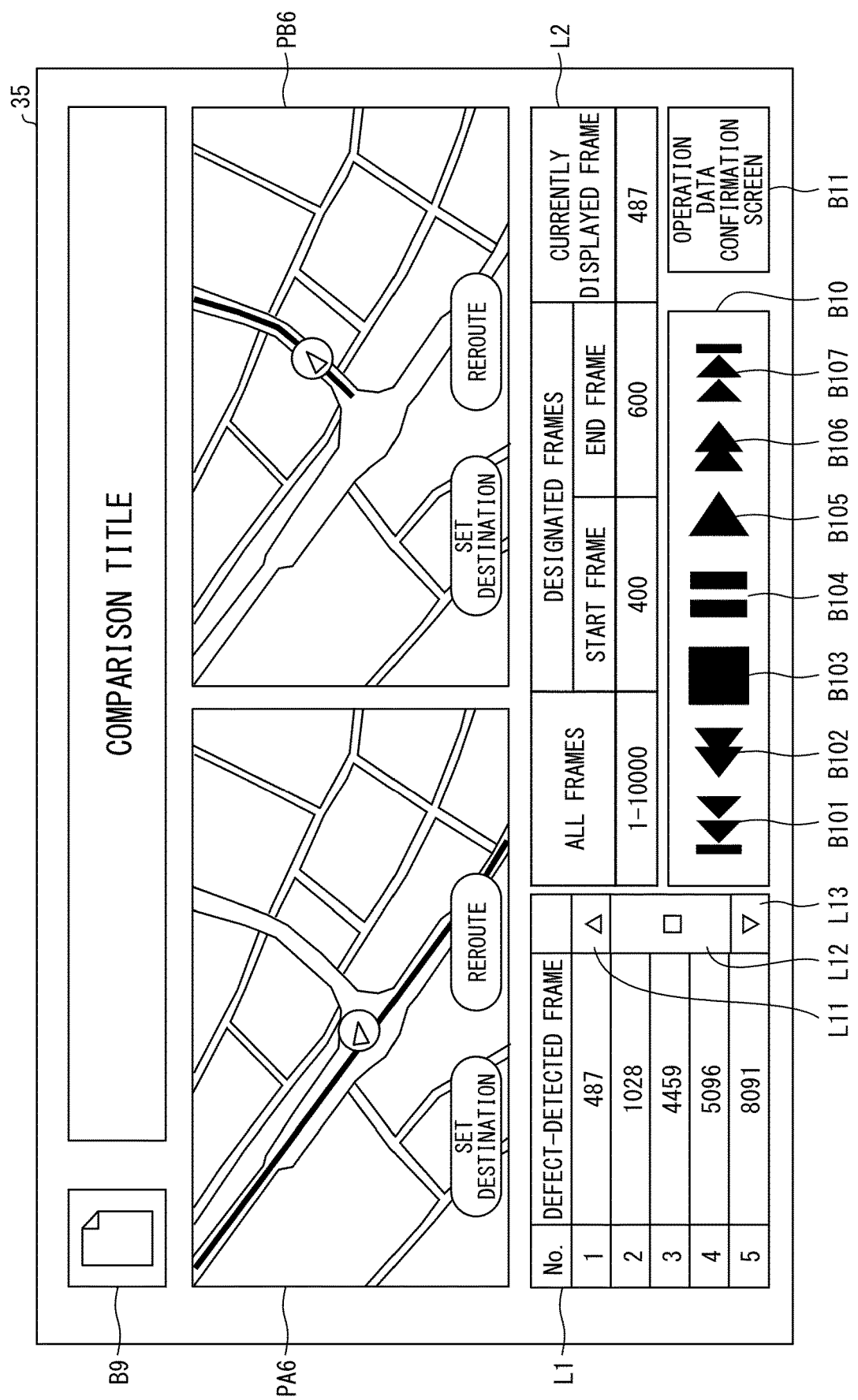
FIG. 14 illustrates an example of a result playback screen.

FIG. 14 illustrates an example of the result playback screen. The third control section 33 controls the third display section 351 to display the result playback screen in a case where, for example, a predetermined input operation is carried out on the input section 34.

The result playback screen has displayed thereon at least (i) information that is based on the test result data 42 and that is indicative of which part of the second data 322 has a defect and (ii) a moving image of the first data 321 and a moving image of the second data 322 which are contained in the test result data 42.

In the example shown in FIG. 14, the result playback screen has displayed thereon a frame image PA6 of the first data 321, a frame image PB6 of the second data 322, and a list L1 of defect-detected frames of the second data 322. The first data 321 and the second data 322 are played back on the result playback screen on a frame-by-frame basis such that frame images with the same frame number are displayed at a time. The playback speed is not particularly limited, and whether the data are played back automatically or not is not particularly limited. The playback speed is preferably a speed at which the data are easily visually perceptible to a user.

The list L1 is composed of, for example, the "NO." column and the "DEFECT-DETECTED FRAME" column.

The numbers in the "NO." column are serial numbers each indicative of how many defect-detected frames are present in the moving image from the first frame to a corresponding defect-detected frame indicated by information in the "DEFECT-DETECTED FRAME" column, including the corresponding defect-detected frame. The numbers in the "DEFECT-DETECTED FRAME" are frame numbers indicative of frames in which defects were detected. The list L1 may be scrolled automatically according to the frame number of the currently displayed moving images of the first data 321 and the second data 322. In this case, the list L1 can be configured to be scrollable with use of buttons L11 to L13 located on the right-hand side of the list L1. Specifically, in a case where a user carries out an input operation by pressing the button L11, the third display control section 335 of the third control section 33 may scroll up the list L1 by a predetermined number of rows. In a case where the user carries out an input operation by pressing the button L12, the third display control section 335 may stop the list L1 from scrolling. In a case where the user carries out an input operation by pressing the button L13, the third display control section 335 may scroll down the list L1 by a predetermined number of rows. Furthermore, in a case where the user carries out an input operation by selecting a specific row of the list L1, the third display control section 335 may cause the moving image PA6 of the first data 321 and the moving image PB6 of the second data 322 to skip forward to or skip back to the frame with the frame number shown in the selected row. In a case where no defects are present in the second data 322, the list L1 may be left blank.

Note that the result playback screen may have displayed thereon an icon button B9 for readout of test results. The icon button B9 is a UI object for readout of test result data 42. When the button B9 is pressed, the third display control section 335 controls the third display section 351 to display a sub-screen on which selection and readout of pieces of test result data 42 are carried out. Upon selection of a piece of test result data 42 by a user on the sub-screen, the third control section 33 reads the selected piece of test result data 42 from the storage device 4, and the third display control section 335 simultaneously plays back the first data 321 and the second data 322 contained in the piece of test result data 42. The third display control section 335 also displays, in the list L1, information that is based on the test result data 42 and that is indicative of a defect-detected frame(s) of the second data 322.

The result playback screen may include UI objects for designating how to play back the first data 321 and the second data 322. For example, in the example shown in FIG. 14, a list L2 is provided. When the "ALL FRAMES" cell of the list L2 is selected, the third display control section 335 simultaneously plays back the first data 321 and the second data 322 from the first frame through to the last frame. Note that the third display control section 335 may also display the total number of frames. In the example shown in FIG. 14, the total number of frames is "1 to 10000". When the "DESIGNATED FRAMES" cell in the list L2 is selected, the third display control section 335 simultaneously plays back the first data 321 and the second data 322 from the frame designated as the start frame to the frame designated as the end frame. In the example shown in FIG. 14, the frame number designated as the start frame is 400, and the frame number designated as the end frame is 600. The number in the column including the "CURRENTLY DISPLAYED FRAME" cell of the list L2 is the frame number of the currently displayed frame of the first data 321 and the second data 322.

The result playback screen may include UI objects for issuing instructions for playback, skip forward, pause, and stop of the first data 321 and the second data 322. In the example shown in FIG. 14, a button group B10 is provided. The button group B10 includes a button B101, a button B107, a button B102, a button B106, a button B103, a button B104, and a button B105. The button B101 is a button to issue an instruction for causing the currently displayed frame to jump to the immediately preceding defect-detected frame of the second data 322. The button B107 is a button to issue an instruction for causing the currently displayed frame to jump to the immediately subsequent defect-detected frame of the second data 322. The button B102 is a button to issue an instruction for causing the currently displayed frame to jump to the immediately preceding frame. The button B106 is a button to issue an instruction for causing the currently displayed frame to jump to the immediately subsequent frame. The button B103 is a button to issue an instruction for stopping the playback. The button B104 is a button to issue an instruction for pausing the playback. The button B105 is a button to issue an instruction for playback. In a case where an input operation is carried out by pressing the button B105 when the playback is being paused at a certain frame, the third display control section 335 restarts the playback of the first data 321 and the second data 322 from that frame. On the other hand, in a case where an input operation is carried out by pressing the button B105 when no playback is in pause state, the third display control section 335 starts playback of the first data 321 and the second data 322 from the start frame designated in the list L2.

The result playback screen may include a button B11 to issue an instruction for carrying out a screen transition to an operation data confirmation screen. The operation data confirmation screen is a screen on which the details of the operation data are checked. In a case where an input operation is carried out by pressing the button B11, the third display control section 335 controls the third display section 351 to display the operation data confirmation screen.

Figure 15:
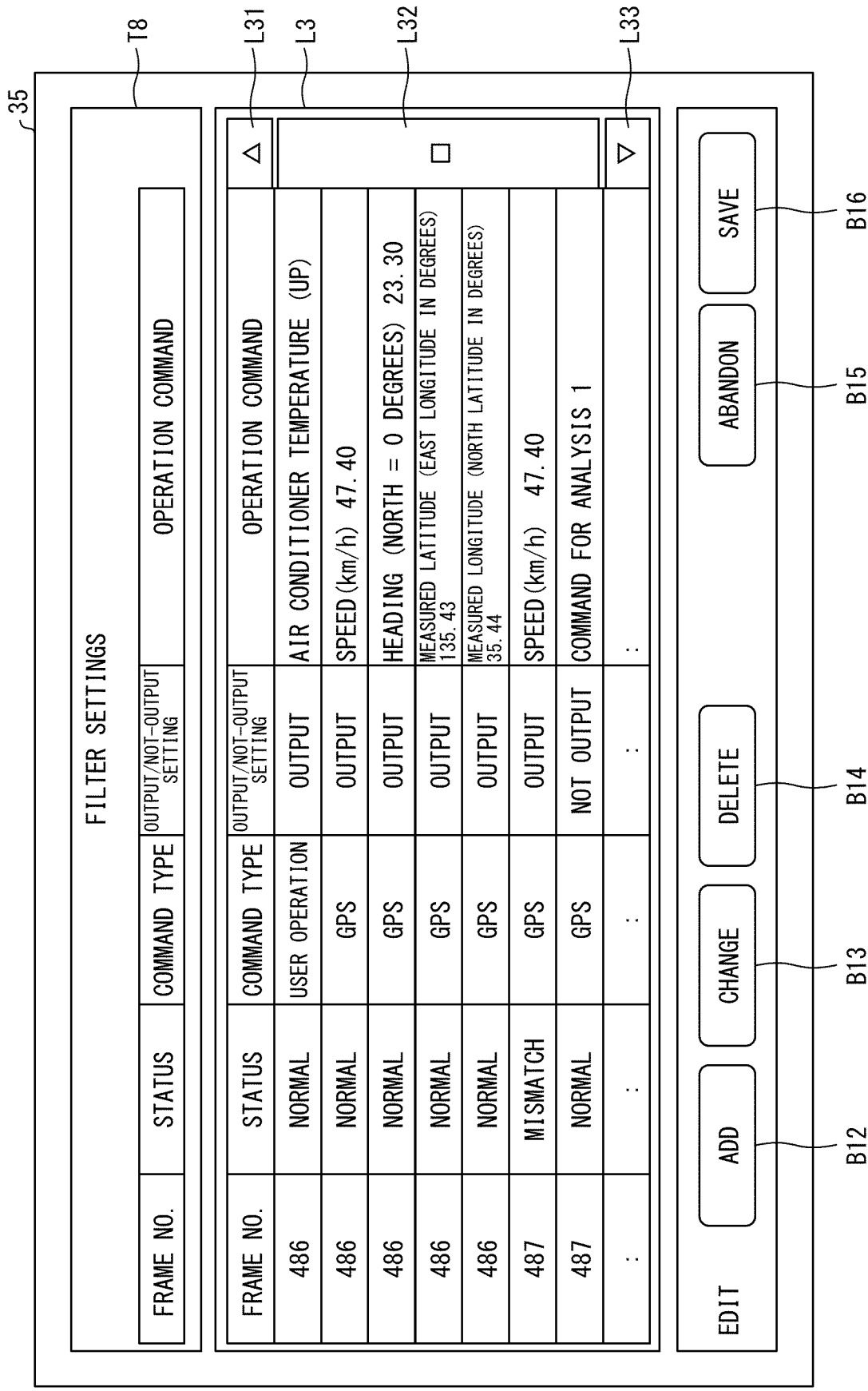
FIG. 15 illustrates an example of an operation data confirmation screen.

FIG. 15 illustrates an example of the operation data confirmation screen. The third display control section 335 reads the operation data 41 from the storage device 4, and thereby obtains information for use in preparation of the operation data confirmation screen. In this way, the third display control section 335 prepares the screen. The operation data confirmation screen includes at least (i) information indicative of content of an operation(s) indicated by the operation data and (ii) information indicative of a point(s) in time at which the operation(s) was/were carried out.

In the example shown in FIG. 15, the operation data confirmation screen includes a list L3. The "FRAME NO." column in the list L3 contains the frame numbers of frames in each of which an input operation was carried out. The information in the "STATUS" column in the list L3 indicates whether the second data 322 in each frame with the frame number in the "FRAME NO." column was normal or abnormal (i.e., the second data 322 did not match up with the first data 321). The information in the "COMMAND TYPE" column indicates the type of operation command shown in the "OPERATION COMMAND" column (described later). The information in the "OUTPUT/NOT-OUTPUT SETTING" column indicates settings of whether or not to output an operation command.

In the example shown in FIG. 15, the operation commands in the rows whose information in the "OUTPUT/NOT-OUTPUT SETTING" column is set to "OUTPUT" are outputted on the reference apparatus 1 and the tested apparatus 2 as user input operations. For example, with regard to an operation command such as that corresponding to an input operation carried out by selecting a specific object such as a button, the information in the "OUTPUT/NOT-OUTPUT SETTING" column is set to "OUTPUT". On the contrary, an operation command whose information in the "OUTPUT/NOT-OUTPUT SETTING" column is "NOT OUTPUT" is not outputted on the reference apparatus 1 and the tested apparatus 2. For example, the operation data may contain check data that is not relevant to the operations of the reference apparatus 1 and the tested apparatus 2 but that is used in analysis of a defect. With regard to such check data, the information in the "OUTPUT/NOT-OUTPUT SETTING" column is set to "NOT OUTPUT".

The information in the "OPERATION COMMAND" column indicates operation commands each indicative of the content of an input operation in each row. The "OPERATION COMMAND" column may also contain information indicative of parameter values set by operation commands.

The list L3 may be scrolled automatically according to the frame number of the currently displayed moving images of the first data 321 and the second data 322. The list L3 can be configured to be scrollable with use of buttons L31 to L33 located on the right-hand side of the list L3. Specifically, in a case where a user carries out an input operation by pressing the button L31, the third display control section 335 of the third control section 33 may scroll up the list L3 by a predetermined number of rows. In a case where the user carries out an input operation by pressing the button L32, the third display control section 335 may stop the list L3 from scrolling. In a case where the user carries out an input operation by pressing the button L33, the third display control section 335 may scroll down the list L3 by a predetermined number of rows.

In a case where the operation data 41 is editable on the testing device 3 like the testing device 3 of the test system 800 discussed in Embodiment 3, the operation data confirmation screen may include: a button B12 to issue an instruction for making an addition to the operation data 41, i.e., an instruction for adding a row to the list L3; a button B13 to issue an instruction for making a change to the operation data 41; a button B14 to issue an instruction for deleting part or all of the operation data 41; a button B15 to issue an instruction for canceling the edit of the operation data 41, i.e., an instruction for abandoning the edited version of the operation data 41 having been edited before a button B16 (described below) is pressed; and the button B16 to issue an instruction for saving the edited version of the operation data 41. Such an arrangement, in which the user edits the operation data 41 by operating the buttons B12 to B16 while checking the operation data 41 on the list L3, makes it possible for the user to easily edit the operation data 41.

[Variations]

According to a test system in accordance with the present invention, operation data indicative of (i) content of an input operation carried out on the tested apparatus 2 and (ii) a point in time at which the operation was carried out may be acquired from the tested apparatus 2. For convenience of description, the operation data acquired from the tested apparatus 2 is hereinafter referred to as "tested apparatus operation data".

In this case, the tested apparatus 2 includes a tested apparatus input section and a tested apparatus data preparing section. The tested apparatus input section receives a user input operation carried out on the tested apparatus 2. The tested apparatus input section transmits content of the input operation to the second control section 23. Note that there is no particular limitation on a specific configuration of the tested apparatus input section. For example, the tested apparatus input section may be configured integrally with the second display section 24 to form a touch panel display.

The tested apparatus data preparing section prepares operation data based on the user input operation received via the tested apparatus input section. There is no particular limitation on a point in time at which the tested apparatus data preparing section prepares the operation data. For example, the following arrangement may be employed: while the second display control section 231 is controlling the second display section 24 to display an image, the tested apparatus data preparing section (i) identifies the content of a user's instruction relating to image display, i.e., the content of the input operation, and the point in time at which the input operation was carried out, and (ii) prepares the tested apparatus operation data that contains the content of the input operation and the point in time at which the input operation was carried out. The tested apparatus data preparing section transmits the thus-prepared tested apparatus operation data to the testing device 3. Note that the tested apparatus operation data may be transmitted to the testing device 3 together with the second data or may be transmitted to the testing device 3 separately from the second data.

The data collecting section 31 of the testing device 3 receives the tested apparatus operation data, and stores the tested apparatus operation data, as operation data 41, in the storage device 4. Note that, in a case where the data collecting section 31 receives operation data also from the reference apparatus 1, the data collecting section 31 may store the operation data and the tested apparatus operation data separately in the storage device 4. The testing device 3 may carry out the rest of the process discussed in any of the foregoing embodiments with use of the tested apparatus operation data, i.e., operation data 41 derived from the tested apparatus 2.

According to the above arrangement, it is possible, for example, to (i) obtain, from the tested apparatus 2 in which there is a defect, tested apparatus operation data, i.e., history of operations carried out on the tested apparatus 2, and (ii) with use of the history, obtain, on the reference apparatus 1, first data that is based on the tested apparatus operation data. Specifically, it is possible to obtain first data that results when the reference apparatus 1 is operated under the same conditions as those in which the tested apparatus 2 (in which there is a defect) was operated. It is then possible to determine whether or not there is a defect in second data by comparing the first data and second data. With use of the result of this determination and settings on an apparatus used as the reference apparatus 1, it is possible to determine the cause of the defect in the tested apparatus 2.

An example arrangement is as follows: an apparatus that executes a display program which is the same as but is a different version of a display program on the tested apparatus 2 is used as the reference apparatus 1; and a screen display test is carried out using tested apparatus operation data. This makes it possible to check whether or not the cause of the defect in the tested apparatus 2 is one that occurs only in a specific version of the display program.

In a case where both the reference apparatus 1 and the tested apparatus 2 are automotive navigation terminals, the apparatuses may be installed on the same automobile and, while the automobile is actually running, a tester may carry out input operations on the reference apparatus 1 and the tested apparatus 2. Note here that it is preferable that the input operations having the same content are carried out at the same point in time on the two apparatuses. The data collecting section 31 of the testing device 3 receives operation data and first data from the reference apparatus 1, and receives tested apparatus operation data and second data from the tested apparatus 2.

Note that, in the above case, the tested apparatus 2 includes a GPS receiver. The GPS receiver has the same functions as that of the reference apparatus 1. Furthermore, the tested apparatus data preparing section prepares tested apparatus operation data that contains (i) location information indicative of a current location and (ii) information indicative of a point in time at which the location information was acquired.

The comparing section 333 of the testing device 3 reads the foregoing first data and second data, as first data 321 and second data 322, and compares the first data 321 and the second data 322. The third control section 33 may carry out a comparison between the operation data and the tested apparatus operation data. The third display control section 335 may then control the third display section 351 to display the result of the comparison.

This makes it possible to (i) carry out a comparison between the operation data and the tested apparatus operation data and (ii) obtain the result of the screen display test, in a case where the reference apparatus 1 and the tested apparatus 2 are actually operated at the same time under the same conditions.

Aspects of the present invention can also be expressed as follows.

(1) An information processor in accordance with a first aspect of the present invention includes a first data acquiring section, a second data acquiring section, a comparing section, a searching section, and a display control section. The first data acquiring section is configured to acquire first data. The first data is moving image data generated by a reference apparatus on the basis of first operation data that contains (i) information indicative of content of a user operation and (ii) information indicative of a point in time at which the user operation was carried out. The second data acquiring section is configured to acquire second data. The second data is moving image data generated by a tested apparatus on the basis of second operation data that is identical to the first operation data. The comparing section is configured to carry out a comparison between the first data and the second data sequentially on a per-frame basis. The searching section is configured such that, in a case where a result of the comparison by the comparing section indicates that there is a frame in which the first data and the second data do not match up with each other, the searching section (i) decides to use, as a base image, one of respective frame images of the first data and the second data in the frame and (ii) carry out a search as to whether or not any of frame images, in a predetermined number of frames preceding and/or following the other of the respective frame images, matches up with the base image. The display control section is configured such that, in a case where none of the frame images in the predetermined number of frames matches up with the base image, the display control section controls an output section to make an output indicating that there is a defect in the second data.

(2) An information processor in accordance with a second aspect of the present invention may be arranged such that the second data acquiring section is configured to acquire, sequentially in real time, the second data generated by the tested apparatus. The comparing section may be configured to sequentially compare (i) the first data and (ii) the second data acquired by the second data acquiring section.

(3) An information processor in accordance with a third aspect of the present invention may be arranged such that the operation data contains (i) regularly-updated location information and (ii) information indicative of a point in time at which the location information was acquired or updated. The first data and the second data may each contain a map image of a predetermined area generated in accordance with the regularly-updated location information.

(4) An information processor in accordance with a fourth aspect of the present invention is preferably arranged such that the predetermined number of frames, divided by a frame rate of the first data or the second data, is a period shorter than 0.3 seconds.

(5) An information processor in accordance with a fifth aspect of the present invention may be arranged such that the display control section is configured such that, in a case where none of the frame images in the predetermined number of frames matches up with the base image, the display control section controls the output section to output a frame number of the base image.

(6) An information processor in accordance with a sixth aspect of the present invention may be arranged such that the output section includes at least one of a display section and a communication section. The display section is configured such that, in a case where none of the frame images in the predetermined number of frames matches up with the base image, the display section carries out display that indicates that there is a defect in the second data. The communication section is configured such that, in a case where none of the frame images in the predetermined number of frames matches up with the base image, the communication section notifies an external device that there is a defect in the second data.

(7) An information processor in accordance with a seventh aspect of the present invention may include a different part identifying section. The different part identifying section is configured such that, in a case where there is a frame in which the first data and the second data do not match up with each other, the different part identifying section identifies which part(s) is/are different between respective frame images of the first data and the second data in the frame. The searching section may be configured to decide the predetermined number of frames in accordance with where in the respective frame images the different part(s) is/are located.

(8) A method of controlling an information processor in accordance with an eighth aspect of the present invention includes a first data acquiring step, a second data acquiring step, a comparing step, a searching step, and a display control step. The first data acquiring step includes acquiring first data. The first data is moving image data generated by a reference apparatus on the basis of first operation data that contains (i) information indicative of content of a user operation and (ii) information indicative of a point in time at which the user operation was carried out. The second data acquiring step includes acquiring second data. The second data is moving image data generated by a tested apparatus on the basis of second operation data that is identical to the first operation data. The comparing step includes carrying out a comparison between the first data and the second data sequentially on a per-frame basis. The searching step includes, in a case where a result of the comparison in the comparing step indicates that there is a frame in which the first data and the second data do not match up with each other, (i) deciding to use, as a base image, one of respective frame images of the first data and the second data in the frame and (ii) carrying out a search as to whether or not any of frame images, in a predetermined number of frames preceding and/or following the other of the respective frame images, matches up with the base image. The display control step includes, in a case where none of the frame images in the predetermined number of frames matches up with the base image, controlling an output section to make an output indicating that there is a defect in the second data.

(9) A storage medium in accordance with a ninth aspect of the present invention is a non-transitory computer-readable storage medium storing therein a control program for controlling a computer to function as an information processor. The control program controls the computer to carry out: a first data acquiring step, a second data acquiring step, a comparing step, a searching step, and a display control step. The first data acquiring step includes acquiring first data. The first data is moving image data generated by a reference apparatus on the basis of first operation data that contains (i) information indicative of content of a user operation and (ii) information indicative of a point in time at which the user operation was carried out. The second data acquiring step includes acquiring second data. The second data is moving image data generated by a tested apparatus on the basis of second operation data that is identical to the first operation data. The comparing step includes carrying out a comparison between the first data and the second data sequentially on a per-frame basis. The searching step includes, in a case where a result of the comparison in the comparing step indicates that there is a frame in which the first data and the second data do not match up with each other, (i) deciding to use, as a base image, one of respective frame images of the first data and the second data in the frame and (ii) carrying out a search as to whether or not any of frame images, in a predetermined number of frames preceding and/or following the other of the respective frame images, matches up with the base image. The display control step includes, in a case where none of the frame images in the predetermined number of frames matches up with the base image, controlling an output section to make an output indicating that there is a defect in the second data.

[Software Implementation Example]

Control blocks of apparatuses and devices included in the test systems 600, 700, 800, 900, 1000, 1100, and 1200 (particularly, sections included in the third control section 33) can be realized by a logic circuit (hardware) provided in an integrated circuit (IC chip) or the like or can be alternatively realized by software.

In the latter case, the apparatuses and devices included in the test systems 600, 700, 800, 900, 1000, 1100 and 1200 each include a computer that executes instructions of a program that is software realizing the foregoing functions. The computer, for example, includes at least one processor and a computer-readable storage medium storing the program. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 reference apparatus
2 tested apparatus
3 testing device
4 storage device
5 first camera
6 second camera
7 first testing device
8 second testing device
11 first operation data acquiring section
12 first storage section
13 first control section
14 first display section
15 reference apparatus input section
21 second operation data acquiring section
22 second storage section
23 second control section
24 second display section
25 program receiving section
31 data collecting section
32 third storage section
33 third control section (information processor)
34 input section
35 output section
36 operation data output section
37 program transmitting section
38 first communication control section
39 first input section
41 operation data
42 test result data
43 update program data
51 operation data output section
52 fourth control section
53 second input section
54 fourth display section
55 second communication control section
131 first display control section
132 first capturing section
133 reference apparatus data preparing section
231 second display control section
232 second capturing section
321 first data
322 second data
331 first data acquiring section
332 second data acquiring section
333 comparing section
334 searching section
335 third display control section
336 testing device data preparing section
337 different part identifying section
351 third display section
352 communication section
521 fourth display control section
600, 700, 800, 900, 1000, 1100, 1200 test system

The invention claimed is:

1. An information processing device comprising a processor configured to:
   acquire first data;
   acquire second data;
   perform a comparison between the first data and the second data sequentially on a per-frame basis;

in a case where a result of the comparison indicates that there is a frame in which the first data and the second data do not match up with each other, (i) determine to use, as a base image, one of respective frame images of the first data and the second data in the frame, and (ii) perform a search as to whether or not any of frame images, in a predetermined number of frames preceding and/or following the other of the respective frame images, matches the base image; and in a case where none of the frame images in the predetermined number of frames matches the base image, provide an output indicating a defect in the second data;

wherein the first data is moving image data generated by a reference apparatus on the basis of first operation data that includes (i) information indicative of content of a user operation and (ii) information indicative of a point in time at which the user operation is performed, and wherein the second data is moving image data generated by a tested apparatus on the basis of second operation data that is identical to the first operation data.

2. The information processing device of claim 1, wherein the processor is further configured to:

acquire, sequentially in real time, the second data generated by the tested apparatus; and sequentially compare (i) the first data and (ii) the second data acquired sequentially in real time.

3. The information processing device of claim 1, wherein:

the operation data includes (i) regularly-updated location information and (ii) information indicative of a point in time at which the location information is acquired or updated; and the first data and the second data each include a map image of a predetermined area generated in accordance with the regularly-updated location information.

4. The information processing device of claim 1, wherein the predetermined number of frames, divided by a frame rate of the first data or the second data, is a period shorter than 0.3 seconds.

5. The information processing device of claim 1, wherein the processor is further configured to output a frame number of the base image in a case where none of the frame images in the predetermined number of frames matches up with the base image.

6. The information processing device of claim 1, further comprising:

a display device configured to display an indication of a defect in the second data in a case where none of the frame images in the predetermined number of frames matches up with the base image; and a transmitter configured to notify an external device that there is a defect in the second data, in a case where none of the frame images in the predetermined number of frames matches the base image.

7. A method of controlling an information processor, comprising:

a first data acquiring step comprising acquiring first data;

a second data acquiring step comprising acquiring second data;

a comparing step comprising carrying out a comparison between the first data and the second data sequentially on a per-frame basis;

a searching step comprising, in a case where a result of the comparison in the comparing step indicates that there is a frame in which the first data and the second data do not match up with each other, (i) deciding to use, as a base image, one of respective frame images of the first data and the second data in the frame and (ii) carrying out a search as to whether or not any of frame images, in a predetermined number of frames preceding and/or following the other of the respective frame images, matches up with the base image; and a display control step comprising, in a case where none of the frame images in the predetermined number of frames matches up with the base image, controlling an output section to make an output indicating that there is a defect in the second data, the first data being moving image data generated by a reference apparatus on the basis of first operation data that contains (i) information indicative of content of a user operation and (ii) information indicative of a point in time at which the user operation was carried out, the second data being moving image data generated by a tested apparatus on the basis of second operation data that is identical to the first operation data.

8. A non-transitory computer-readable storage medium storing therein a control program for controlling a computer to function as an information processor, the control program controlling the computer to carry out:

a first data acquiring step comprising acquiring first data;

a second data acquiring step comprising acquiring second data;

a comparing step comprising carrying out a comparison between the first data and the second data sequentially on a per-frame basis;

a searching step comprising, in a case where a result of the comparison in the comparing step indicates that there is a frame in which the first data and the second data do not match up with each other, (i) deciding to use, as a base image, one of respective frame images of the first data and the second data in the frame and (ii) carrying out a search as to whether or not any of frame images, in a predetermined number of frames preceding and/or following the other of the respective frame images, matches up with the base image; and a display control step comprising, in a case where none of the frame images in the predetermined number of frames matches up with the base image, controlling an output section to make an output indicating that there is a defect in the second data, the first data being moving image data generated by a reference apparatus on the basis of first operation data that contains (i) information indicative of content of a user operation and (ii) information indicative of a point in time at which the user operation was carried out, the second data being moving image data generated by a tested apparatus on the basis of second operation data that is identical to the first operation data.

* * * * *